(12) United States Patent
Saijo et al.

(10) Patent No.: US 6,384,921 B1
(45) Date of Patent: May 7, 2002

(54) PRINTING METHOD AND APPARATUS AND PRINTING SYSTEM INCLUDING PRINTING APPARATUS

(75) Inventors: Shinichi Saijo; Akira Katayama, both of Yokohama; Kouhei Ishikawa, Kawasaki; Masahide Hasegawa, Tokyo; Kenichi Moritoki, Higashiyamato; Moriyoshi Inaba, Tokyo, all of (JP)

(73) Assignee: Canon Aptex Kabushiki Kaisha, Mitsukaido (JP)

( * ) Notice: Subject to any disclaimer, the term of this patent is extended or adjusted under 35 U.S.C. 154(b) by 0 days.

(21) Appl. No.: 09/081,041

(22) Filed: May 19, 1998

(30) Foreign Application Priority Data

| May 20, 1997 | (JP) | 9-130045 |
| May 20, 1997 | (JP) | 9-130047 |
| May 20, 1997 | (JP) | 9-130048 |

(51) Int. Cl.$^7$ ............... G06F 15/00; H04N 1/40; H04N 1/21; H04N 1/387
(52) U.S. Cl. ............ 358/1.1; 358/443; 358/296; 358/452
(58) Field of Search .............. 358/443, 296, 358/1.1, 452, 450, 453, 462; 364/900

(56) References Cited

U.S. PATENT DOCUMENTS

| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. |
| 4,558,333 A | 12/1985 | Sugitani et al. |
| 4,608,577 A | 8/1986 | Hori |
| 4,718,040 A | * 1/1988 | Ayata et al. ............ 364/900 |
| 4,723,129 A | 2/1988 | Endo et al. |
| 4,740,796 A | 4/1988 | Endo et al. |
| 4,866,532 A | * 9/1989 | Ayata et al. ............ 358/443 |
| 5,613,045 A | * 3/1997 | Morimoto et al. ......... 358/1.2 |

FOREIGN PATENT DOCUMENTS

| JP | 54-056847 | 5/1979 |
| JP | 59-123670 | 7/1984 |
| JP | 59-138461 | 8/1984 |
| JP | 60-071260 | 4/1985 |

* cited by examiner

Primary Examiner—Edward Coles
Assistant Examiner—Twyler Lamb
(74) Attorney, Agent, or Firm—Fitzpatrick, Cella, Harper & Scinto

(57) ABSTRACT

A printing method and apparatus in which basic image data and information of the printing position of the image data on a recording medium are input from a data source and stored in advance, and the designated image data is bitmapped at the printing position to print an image, thereby increasing the printing speed, and a printing system including the printing apparatus. In this system, image data sent from a host is registered as a basic image, and the image is bitmapped in an image memory on the basis of the information of the printing position, of the stored basic image data on a printing paper sheet, sent from the host. The image data bitmapped in the image memory is then output to a printhead to print the image. When the bitmapped image data is to be copied to a print buffer on the basis of an image copy command, the copy operation is preferably performed concurrently with registering operation for an image management table and bitmapping operation for an image registration buffer which are performed when image data different from the image data to be copied is input. In addition, the registered image data may be stored in one print buffer, and the registered image data may be copied to another print buffer on the basis of another command. Printout operation may be performed on the basis of the copied image data.

55 Claims, 41 Drawing Sheets

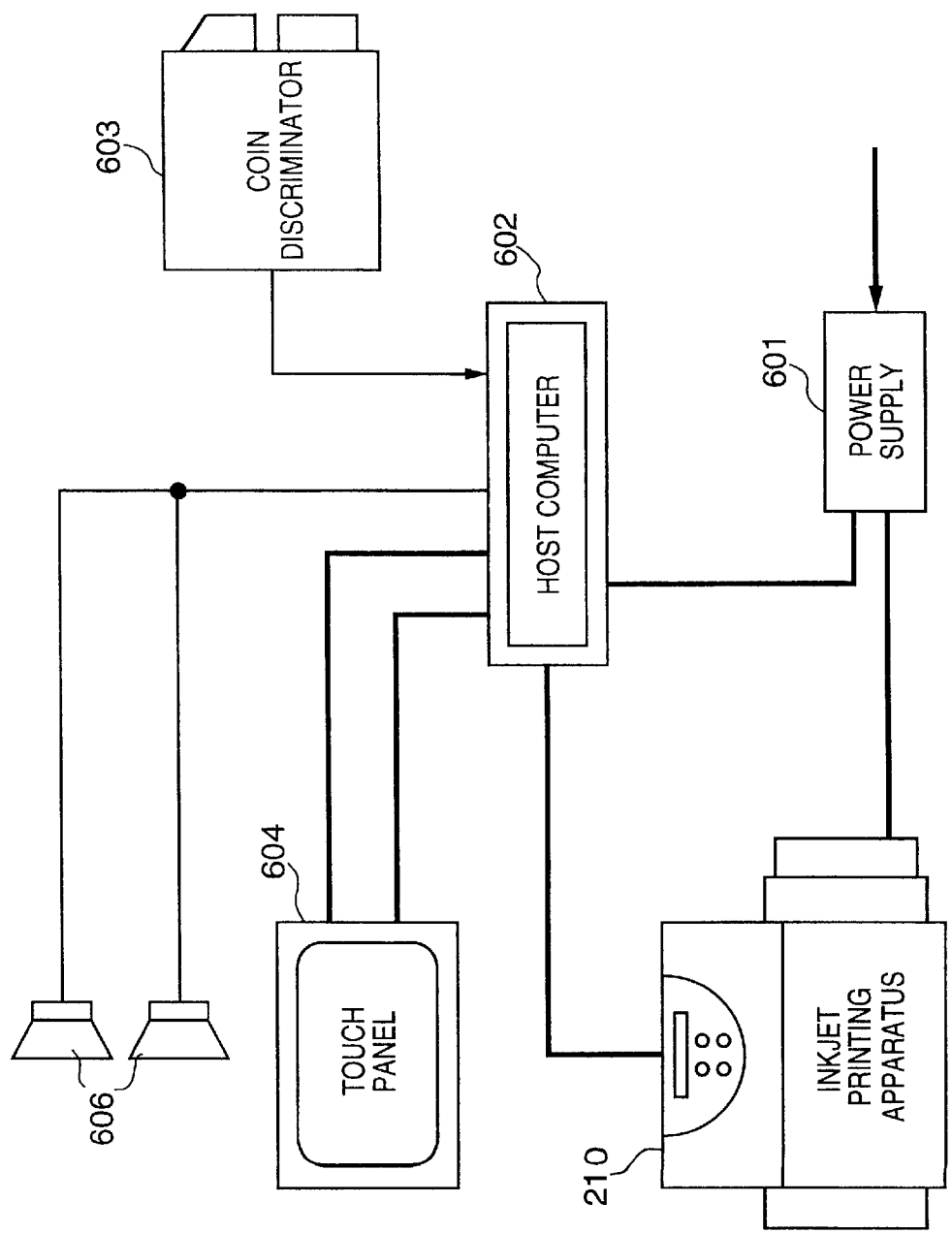

FIG. 6

| | | |
|---|---|---|
| 401 | ESC [ K cnt – LH | PRINTER RESET |
| 402 | ESC [ P cnt – LH | PAPER SIZE COMMAND |
| 403 | ESC ( p cnt – LH | PRINT COUNT SETTING COMMAND |
| 404 | ESC ( b cnt – LH | SETTING / CANCELING OF COMPRESSED BIT IMAGE MODE |
| 405 | ESC ( V cnt – LH 0 | IMAGE REGISTRATION START |
| 406 | ESC ( W cnt – HML Y | IMAGE (Y) |
| 407 | ESC ( W cnt – HML M | IMAGE (M) |
| 408 | ESC ( W cnt – HML C | IMAGE (C) |
| 409 | ESC ( W cnt – HML K | IMAGE (K) |
| 410 | ESC ( X cnt – LH | IMAGE REGISTRATION END |
| 411 | ESC ( V cnt – LH 1 | IMAGE REGISTRATION START |
| 412 | ESC ( W cnt – HML Y | IMAGE (Y) |
| 413 | ESC ( W cnt – HML M | IMAGE (M) |
| 414 | ESC ( W cnt – HML C | IMAGE (C) |
| 415 | ESC ( W cnt – HML K | IMAGE (K) |
| 416 | ESC ( X cnt – LH | IMAGE REGISTRATION END |
| 417 | ESC ( Y cnt – LH 0 | COPY POSITION DESIGNATION |
| 418 | ESC ( Y cnt – LH 1 | COPY POSITION DESIGNATION |
| 419 | ESC ( i cnt – LH | PRINTING START |

400

FIG. 15
SETTING COMMAND
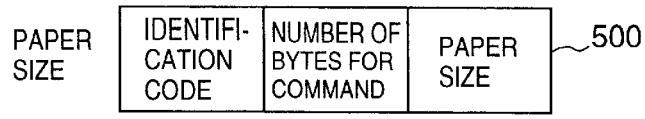
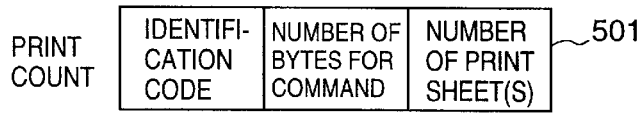
RASTER IMAGE COMMAND
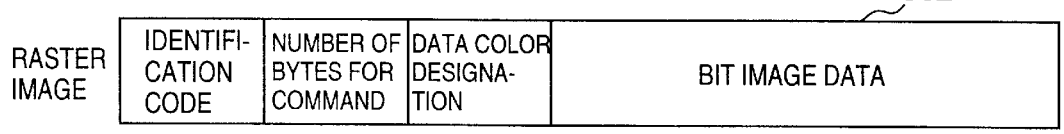
COORDINATE UPDATE COMMAND
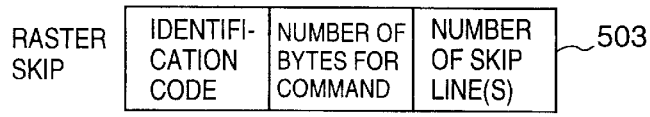
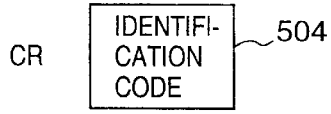
PRINTING START COMMAND
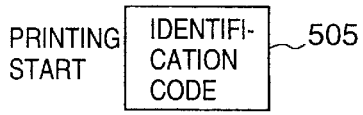
REGISTRATION START COMMAND
REGISTRATION END COMMAND
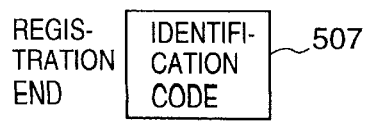
REGISTERED IMAGE COPY COMMAND
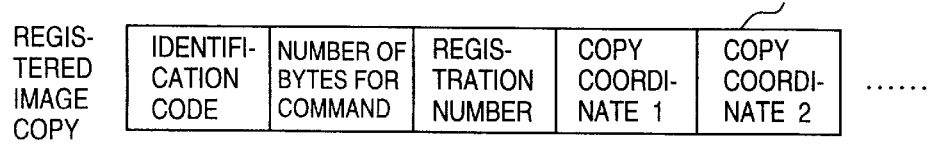

FIG. 21

IMAGE REGISTRATION TABLE 800

| IMAGE NUMBER | IMAGE START ADDRESS | HORIZONTAL IMAGE SIZE INFORMATION | VERTICAL IMAGE SIZE INFORMATION |
|---|---|---|---|
| 1 | 100000 | 100 | 100 |
| 2 | | | |
| 3 | | | |
| 4 | | | |

800
IMAGE REGISTRATION TABLE

| IMAGE NUMBER (801) | IMAGE START ADDRESS (802) | HORIZONTAL IMAGE SIZE INFORMATION (803) | VERTICAL IMAGE SIZE INFORMATION (804) |
|---|---|---|---|
| 1 | 100000 | 100 | 100 |
| 2 | 200000 | 200 | 300 |
| 3 | | | |
| 4 | | | |

F I G. 24
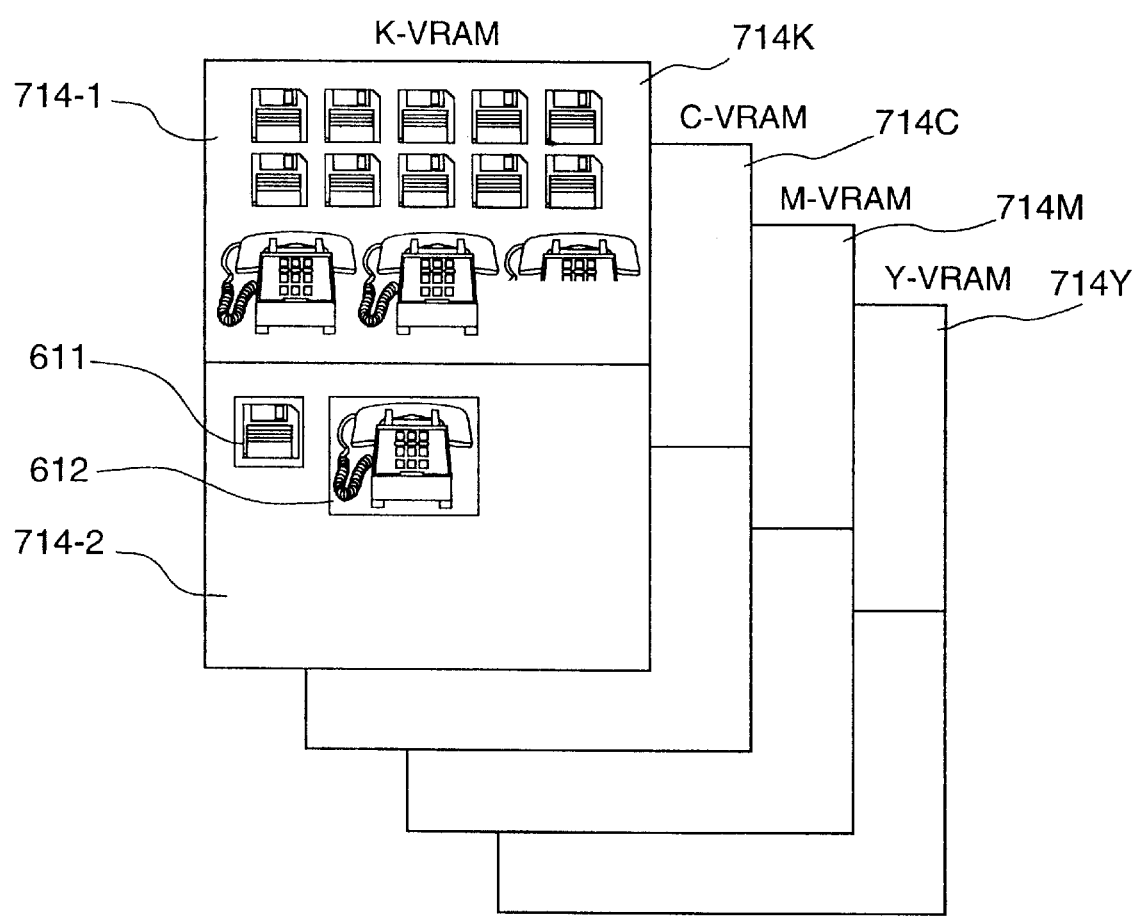

FIG. 28

SETTING COMMAND

| PAPER SIZE | IDENTIFICATION CODE | NUMBER OF BYTES FOR COMMAND | PAPER SIZE | ~500 |

| PRINT COUNT | IDENTIFICATION CODE | NUMBER OF BYTES FOR COMMAND | NUMBER OF PRINT SHEET(S) | ~501 |

RASTER IMAGE COMMAND

| RASTER IMAGE | IDENTIFICATION CODE | NUMBER OF BYTES FOR COMMAND | DATA COLOR DESIGNATION | BIT IMAGE DATA | ~502 |

COORDINATE UPDATE COMMAND

| RASTER SKIP | IDENTIFICATION CODE | NUMBER OF BYTES FOR COMMAND | NUMBER OF SKIP LINE(S) | ~503 |

| CR | IDENTIFICATION CODE | ~504 |

PRINTING START COMMAND

| PRINTING START | IDENTIFICATION CODE | ~505 |

REGISTRATION START COMMAND

| REGISTRATION START | IDENTIFICATION CODE | REGISTRATION NUMBER | REGISTERED IMAGE SIZE | ~506 |

REGISTRATION END COMMAND

| REGISTRATION END | IDENTIFICATION CODE | ~507 |

REGISTERED IMAGE COPY COMMAND

| REGISTERED IMAGE COPY | IDENTIFICATION CODE | NUMBER OF BYTES FOR COMMAND | REGISTRATION NUMBER | COPY COORDINATE 1 | COPY COORDINATE 2 | ...... | ~508 |

IMAGE REGISTRATION TABLE 801

| IMAGE NUMBER | IMAGE START ADDRESS 802 | HORIZONTAL IMAGE SIZE INFORMATION 803 | VERTICAL IMAGE SIZE INFORMATION 804 |
|---|---|---|---|
| 1 | 100000 | 100 | 100 |
| 2 | 200000 | 200 | 300 |
| 3 | | | |
| 4 | | | |

FIG. 32

REGISTERED IMAGE COPY COMMAND

| IDENTIFICATION CODE | NUMBER OF BYTES FOR COMMAND | REGISTRATION NUMBER (1) | COPY COORDINATE 1 | COPY COORDINATE 2 | ...... | COPY COORDINATE 10 (904) |
| --- | --- | --- | --- | --- | --- | --- |
| IDENTIFICATION CODE | NUMBER OF BYTES FOR COMMAND | REGISTRATION NUMBER (2) | COPY COORDINATE 11 | COPY COORDINATE 12 | | COPY COORDINATE 13 (905) |

FIG. 34

SETTING COMMAND

PAPER SIZE | IDENTIFICATION CODE | NUMBER OF BYTES FOR COMMAND | PAPER SIZE | ~500

PRINT COUNT | IDENTIFICATION CODE | NUMBER OF BYTES FOR COMMAND | NUMBER OF PRINT SHEET(S) | ~501

RASTER IMAGE COMMAND ~502

RASTER IMAGE | IDENTIFICATION CODE | NUMBER OF BYTES FOR COMMAND | DATA COLOR DESIGNATION | BIT IMAGE DATA

COORDINATE UPDATE COMMAND

RASTER SKIP | IDENTIFICATION CODE | NUMBER OF BYTES FOR COMMAND | NUMBER OF SKIP LINE(S) | ~503

CR | IDENTIFICATION CODE | ~504

PRINTING START COMMAND

PRINTING START | IDENTIFICATION CODE | ~505

REGISTRATION START COMMAND

REGISTRATION START | IDENTIFICATION CODE | REGISTRATION NUMBER | REGISTERED IMAGE SIZE | ~506

REGISTRATION END COMMAND

REGISTRATION END | IDENTIFICATION CODE | ~507

REGISTERED IMAGE COPY COMMAND ~508

REGISTERED IMAGE COPY | IDENTIFICATION CODE | NUMBER OF BYTES FOR COMMAND | REGISTRATION NUMBER | COPY COORDINATE 1 | COPY COORDINATE 2 | ......

REGISTRATION RESET COMMAND

REGISTRATION RESET | IDENTIFICATION CODE | ~509

F I G. 37
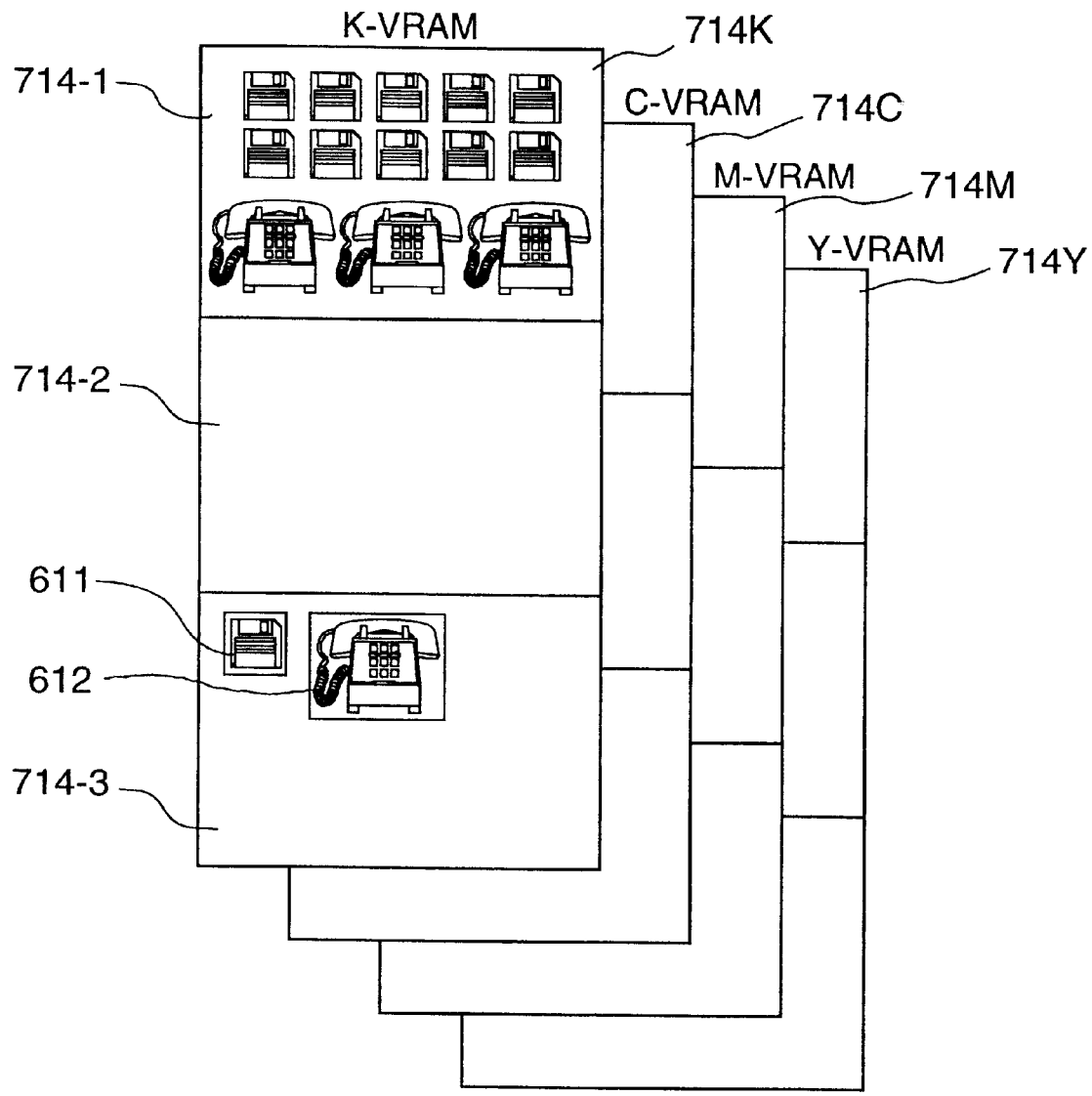

F I G. 38

REGISTERED IMAGE COPY COMMAND

| IDENTIFICATION CODE | NUMBER OF BYTES FOR COMMAND | REGISTRATION NUMBER (1) | COPY COORDINATE 1 | COPY COORDINATE 2 | ...... | COPY COORDINATE 10 — 904 |
|---|---|---|---|---|---|---|

| IDENTIFICATION CODE | NUMBER OF BYTES FOR COMMAND | REGISTRATION NUMBER (2) | COPY COORDINATE 11 | COPY COORDINATE 12 | COPY COORDINATE 13 — 905 |
|---|---|---|---|---|---|

PRINTING START COMMAND

| IDENTIFICATION CODE — 505 |
|---|

FIG. 40

REGISTERED IMAGE COPY COMMAND

| IDENTIFICATION CODE | NUMBER OF BYTES FOR COMMAND | REGISTRATION NUMBER (1) | COPY COORDINATE 1 | COPY COORDINATE 2 | COPY COORDINATE 3 |
|---|---|---|---|---|---|

1504

| IDENTIFICATION CODE | NUMBER OF BYTES FOR COMMAND | REGISTRATION NUMBER (2) | COPY COORDINATE 4 |
|---|---|---|---|

1505

PRINTING START COMMAND

| IDENTIFICATION CODE |
|---|

505

PRINTING METHOD AND APPARATUS AND PRINTING SYSTEM INCLUDING PRINTING APPARATUS

BACKGROUND OF THE INVENTION

This invention relates to a printing method and apparatus and a printing system including the printing apparatus and, more particularly, to a printing method and apparatus which print an image on a recording medium by using a full-line printhead having a printing width equivalent to the width of the recording medium, and a printing system including the printing apparatus.

Vending machines for the sale of seals or the like on which images obtained by synthesizing photographic images of the faces of customers with digital images are printed have recently been known. In the vending machines for the sale of such printed images, the added values of printed images to be sold increase if color illustrations and characters are printed together. Demands have arisen for the use of such printed images as personal cards for casual use and techniques of printing the names of customers on color seals. The printing apparatus used in such a vending machine is required to print color images to increase the added value of printed matter and print images at high speed to handle requests from many customers.

Conventional page printers including the above printing apparatus bitmap all data, corresponding to one page of printing paper, sent from a host computer (to be referred to as a host hereinafter), into a print buffer, and print an image. In this case, even when a plurality of identical patterns are to be printed on one sheet, all the pattern data have to be transmitted from the host or the pattern data are pre-registered in a memory in the printer, and the pattern data are bitmapped in a plurality of areas in the print buffer in accordance with a command from the host. The method of bitmapping the pattern data pre-registered in the memory into the print buffer in accordance with a command from the host, and printing out on the sheet has been often used to shorten the time required for bitmapping the data received from the host.

In the above vending machine, when a photographic image of the face of a customer, the name of the customer, an image, an illustration, and the like are to be printed in color, the name and the like inputted by the customer are synthesized with the image, the illustration, and the like to generate print image data. In this case, as described above, the print data corresponding to one page (one entire sheet) is sent from the host (main control unit) of the vending machine to the printing apparatus. The printing apparatus then analyzes the received print data and prints the corresponding images on one printing paper sheet. Such color image data is generally constituted by a plurality of color component data such as yellow (Y), magenta (M), and cyan (C) component data. For example, a printing apparatus having four printheads for printing Y, M, C, and K (black) color images requires image data four times larger in amount than that required to print a black-and-white (or monochrome) image.

If all such color image data corresponding to one page are bitmapped into bit image data by the host and transmitted therefrom to the printing apparatus, a much longer time is required for the host to bitmap data into image data and transmit the data to the printing apparatus. As a result, a much longer time is required to print images on one sheet. This makes customers wait for a longer period of time, and decreases the processing performance needed to satisfy requirements from customers.

In addition, according to the above conventional pattern bitmapping, when a plurality of identical patterns are to be printed on a plurality of recording media, the printout time can be effectively shortened. When, however, a plurality of identical patterns are to be consecutively printed on one recording medium, the printout time is not shortened so much.

Furthermore, in the above conventional pattern bitmapping, a large amount of data must be transmitted from the host or another storage medium is required to store pattern data. The following problems are therefore posed.

When all the data corresponding to one page of printing paper are to be sent from the host, it takes time to transfer the data as described above. The efficiency of bitmapping data into the buffer greatly deteriorates. For this reason, the period of time between the start of data transfer and the start of printout operation (to be referred to as "the first page print time" hereinafter) becomes very long.

When pattern data are pre-registered in a storage medium such as a memory card, and the patterns are bitmapped into a plurality of areas in the print buffer in accordance with a command from the host, the storage medium must be incorporated in the printer or at least an interface for connecting the storage medium to the printer is required. This greatly increases the cost of the printer.

SUMMARY OF THE INVENTION

Accordingly, it is an object of the present invention to provide a printing method and apparatus capable of increasing the printing speed, and a printing system including the printing apparatus.

It is another object of the present invention to provide a printing method and apparatus which shorten the time required for image processing in a data source and reduce the amount of data transmitted to the printing apparatus so as to shorten the time required to print image data, and a printing system including the printing apparatus.

It is still another object of the present invention to provide a printing method and apparatus in which basic image data is registered in the printing apparatus in advance, and a desired image can be printed by only designating the printing position of the image data on a recording medium, and a printing system including the printing apparatus.

According to one aspect of the present invention, the foregoing object is attained by providing a printing apparatus for printing an image on a recording medium by using a printhead, comprising: a memory storing image data sent from a data source, and copied image data for an image print; storing means for the image data which has been sent from the data source; copying means for copying the image data stored in the memory to an address in the memory corresponding to a printing position in accordance with information of the printing position on the recording medium which is designated by the data source; and printing means for outputting the copied image data by the copying means in the memory to the printhead, and printing the image.

According to another aspect of the present invention, the foregoing object is attained by providing a printing method of printing an image on a recording medium by using a printhead, comprising the steps of: storing image data sent from a data source in a memory; copying the image data stored in the memory to an address in the memory which corresponds to a printing position on the recording medium in accordance with information of the printing position which is designated by the data source; and outputting the copied image data in the memory in the copying step to the printhead, and printing the image.

According to still another aspect of the present invention, the foregoing object is attained by providing a printing system including the above-described printing apparatus, wherein the data source comprises transmission means for transmitting designated image data to the printing apparatus; and position transmission means for transmitting position information designating a printing position of image data on a recording medium to the printing apparatus.

It is still another object of the present invention to provide a printing apparatus and method which can print at high speed by improving data bitmapping efficiency even when identical patterns are to be repeatedly printed on the same page of a recording medium.

In order to attain the foregoing object, the above apparatus further comprises input means for inputting the image data and a printing command for the image data, wherein the memory includes a first memory area used for storing the image data and a second memory area used for storing the copied image data to be printed on a recording medium, the storing means stores the image data in the first memory area on the basis of the printing command inputted by the input means, and the copying means copies the image data stored in the first memory area into the second memory area on the basis of the printing command inputted by the input means, and preferably further comprises control means for controlling to concurrently execute a copy operation performed by the copying means and a storing operation performed by the storing means.

It is preferable in the above-apparatus that the storing means includes registration means for registering image data inputted by the input means as image data to be repeatedly used, and the control means controls to execute the copy operations by the copying means concurrently with a registration operation by the registration means and a storing operation by the storing means performed when image data different from the image data used for the copy operation is inputted.

The printing means preferably prints on the basis of the image data stored in the second memory area.

If the image data is color image data, the data includes yellow (Y), magenta (M), cyan (C), and black (K) components. In this case, the printing means includes storage areas, in each of the first and second memory areas, which correspond to the yellow (Y), magenta (M), cyan (C), and black (K) components.

The printing means preferably prints using a full-line printhead having a printing width equal to the width of the recording medium. The printhead is an inkjet printhead for printing by discharging ink. Preferably, the printhead is a printhead for discharging ink by using heat energy and comprises an electrothermal transducer for generating heat energy to be applied to the ink.

The storing means preferably comprises a table for managing a storage address in the first memory area, for each pattern image expressed by the image data, and horizontal and vertical sizes of the pattern image.

The printing command includes a registration command for giving an instruction to store and register the image data in the first memory area, and a copy command for giving an instruction to bitmap/copy the image data registered in the first memory area into the second memory area. The control means executes a copy command for registered image data, and at the same time, executes a registration command for newly input image data.

Further, in order to attain the foregoing object, the above method further comprises the step of inputting the image data and a printing command for the image data, wherein the memory includes a first memory area used for storing the image data, and a second memory area for storing the copied image data which is to be printed on a recording medium, the image data is stored into the first memory area on the basis of the inputted printing command, and the stored image data in the first memory area is copied into the second memory area on the basis of the inputted printing command, and preferably further comprises the step of controlling to concurrently execute a copy operation performed in the copying step and a storing operation performed in the storing step.

The printing step preferably prints on the basis of the image data stored in the second memory area.

In accordance with the above further specified construction, the memory including the first memory area used for storing image data and the second memory area used for storing the image data to be printed on the recording medium is used, image data and a printing command for the image data are input, the input image data is stored in the first memory area, and the image data stored in the first memory area is copied into the second memory area on the basis of the input printing command. Control is performed to concurrently execute the copy operation and storing operation to be performed when image data different from the image data used for the copy operation is input.

It is still another object of the present invention to provide an inexpensive printing apparatus and method which can print at high speed by improving data bitmapping efficiency even when identical patterns are to be repeatedly printed on the same page of a recording medium.

In order to attain the foregoing object, the above printing apparatus further comprises input means for inputting the image data and a printing command for the image data, wherein the memory comprises a print buffer having a plurality of areas for performing printing on the recording medium, the storing means stores the inputted image data into one of the plurality of areas of the print buffer on the basis of the inputted printing command, and the copying means copies the stored image data into another area of the print buffer on the basis of the inputted printing command.

The printing means preferably prints on the basis of the copied image data.

The apparatus may further comprise registration means for registering the inputted image data and buffer releasing means for canceling registration of the registered image data, and clearing contents of the area of the print buffer in which the registered image data is stored.

The operation performed by the buffer releasing means may be started in response to a printing operation start command for the printing means.

Alternatively, the operation performed by the buffer releasing means may be started in response to a buffer release command inputted by the input means. In this case, the print buffer release command is preferably executed after printing on a plurality of pages of the recording medium is completed.

Preferably, the number of areas of the print buffer is at least three.

The registration means preferably assigns one of the plurality of areas of the print buffer as an area for storing the registered image data. In addition, the registration means preferably comprises a table for managing a storage address in one of the plurality of areas of the print buffer, for each pattern image expressed by the image data, and horizontal and vertical sizes of the pattern image.

Further in order to attain the foregoing object, the above method further comprises the step of inputting the image data and a printing command for the image data, wherein the memory comprises a print buffer having a plurality of areas for storing image data for printing on the recording medium, the image data is stored into one of the plurality of areas of the print buffer on the basis of the inputted printing command, and the stored image data is copied into another area of the print buffer on the basis of the inputted printing command.

In accordance with the above further specified construction, when printing using a print buffer having a plurality of areas for storing image data, image data and a printing command for the image data are input. The input image data is stored in one of the plurality of areas of the print buffer on the basis of the input printing command. The stored image data is copied to another area of the print buffer on the basis of the input printing command, and the copied image data is used to print.

The invention is particularly advantageous since printing speed can be increased by inputting basic image data and information of the printing position of the image data on a recording medium from the data source, pre-storing them, bitmapping designated image data at the printing position in a memory, and printing out the image.

In addition, the time required for image processing in the data source can be shortened, and the amount of data to be transmitted to the printing apparatus is reduced, thereby shortening the time required to print image data.

Furthermore, basic image data is registered in the printing apparatus in advance, and a desired image can be printed by only designating the printing position of the image data on the recording medium.

According to the present invention, even when a plurality of identical patterns are to be printed on one page of a recording medium, all the data need not be input and bitmapped. Since required data can be obtained by only copying/bitmapping and transferring image data between buffers, the data bitmapping efficiency further improves. As a result, the total printing speed can be further increased. This shortens the time the user of the apparatus must wait before a printout is obtained, and increases the maximum number of printing paper sheets that can be printed per unit time.

Moreover, since one of the print buffers is used to store image data as a copy source, no special apparatus arrangement is required. The data bitmapping efficiency can therefore be improved at low cost.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a block diagram showing the basic arrangement of a printed material vending machine having the inkjet printing apparatus according to the first embodiment;

FIG. 6 is a view showing commands transmitted from a host computer to the inkjet printing apparatus in the first embodiment;

FIG. 15 is a view showing the commands used for the execution of printing operation;

FIG. 21 is a view showing the construction of an image management table generated or updated in step S913;

FIG. 23 is a view showing the arrangement of an image management table generated or updated in step S913;

FIG. 24 is a view showing changes in the internal state of the print buffer with the progress of command processing;

FIG. 28 is a view showing the commands for the execution of printing operation;

FIG. 30 is a view showing the construction of an image management table generated or updated in step S913;

FIG. 32 is a view showing the contents of the operands of "registered image copy commands" for copying basic images 601 and 602;

FIG. 34 is a view showing the commands for the execution of printing operation according to a fourth embodiment of the present invention;

FIG. 37 is a view showing changes in the internal state of a print buffer according to the fourth embodiment;

FIG. 38 is a view showing the commands required for printout operation for the first printing paper sheet according to the fourth embodiment;

FIG. 40 is a view showing the commands required for printout operation for the second printing paper sheet according to the fourth embodiment;

DETAILED DESCRIPTION OF THE PREFERRED EMBODIMENTS

Preferred embodiments of the present invention will now be described in detail in accordance with the accompanying drawings. The following several embodiments will exemplify an inkjet printing apparatus. However, the present invention is not limited to this, and may be applied to printing apparatuses based on other printing methods.

Figure 1:
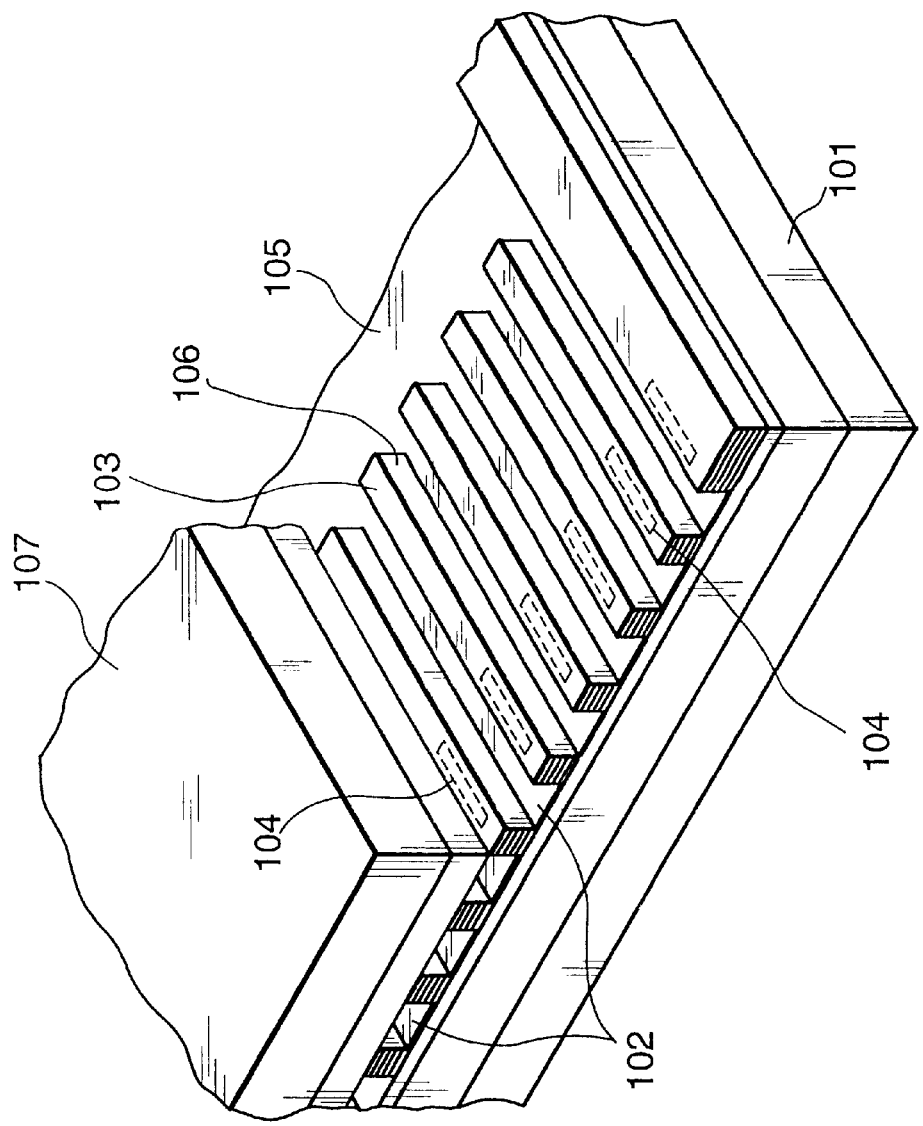
FIG. 1 is a perspective view showing the structure of a printhead used in an inkjet printing apparatus according to an embodiment of the present invention.

FIG. 1 is a perspective view for explaining the structure of a printhead for printing by discharging ink in accordance with an inkjet printing method used in an embodiment of the present invention.

As shown in FIG. 1, each nozzle 106 has a heating element 104 (heater). When a head driving circuit 705 (FIG. 3) (to be described later) applies predetermined electric energy to the heater 104, a bubble is produced in the ink in the nozzle by the heat generated by the heater 104. As a result, an ink droplet is discharged from an orifice 102. Note that the heaters 104 are formed on a silicon board 101 by a technique similar to a semiconductor manufacturing process. Reference numeral 103 denotes a nozzle partition wall as a constituent of each nozzle 106; 105, a common liquid chamber for supplying ink to each nozzle 106; and 107, a top plate.

<First Embodiment>

Figure 2:
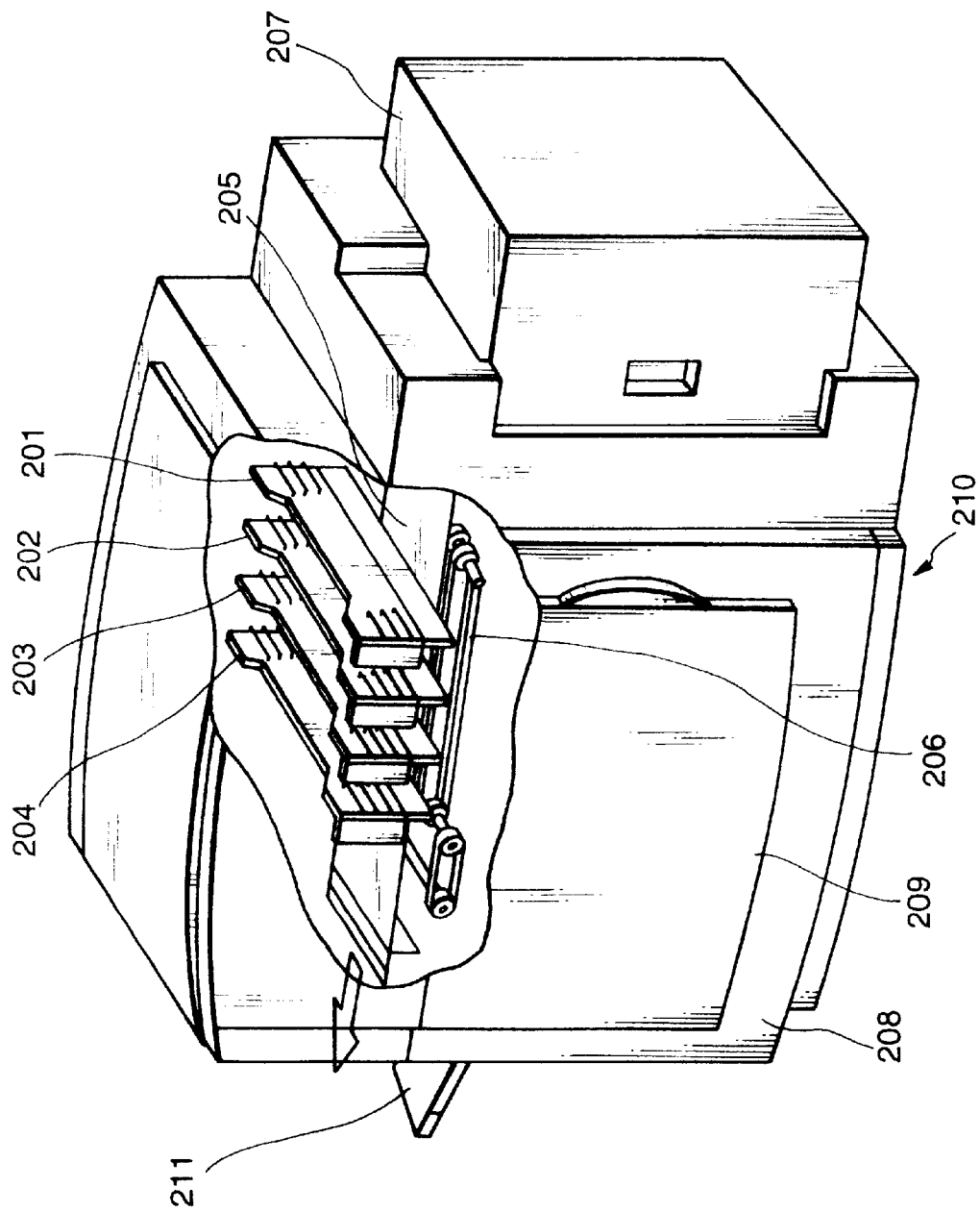
FIG. 2 is a perspective view of an inkjet printing apparatus according to a first embodiment of the present invention.

FIG. 2 is a perspective view for explaining the structure of an inkjet printing apparatus (to be referred to as a printing apparatus hereinafter) 210 according to a first embodiment of the present invention.

The printing apparatus 210 includes inkjet heads (to be referred to as printheads hereinafter) 201 to 204 for printing by discharging ink in accordance with an inkjet printing method, and a recovery unit (not shown) for always ensuring stable ink discharge. A printing paper sheet 205 is fed from a feeder unit 207 to the printing positions of these printheads and is conveyed by a convey unit 206 incorporated in a main unit 208 of this printing apparatus.

An image is printed on the printing paper sheet 205 as follows. When the printing paper sheet 205 is conveyed, and the reference position of the printing paper sheet 205 reaches a position under the printhead 201 for discharging black (K) ink, the black ink is discharged from the printhead 201. Similarly, when the printing paper sheet 205 reaches the reference positions in the order of the printhead 202 for discharging cyan (C) ink, the printhead 203 for discharging magenta (M) ink, and the printhead 204 for discharging yellow (Y) ink, the inks of the respective colors are discharged on the sheet, thereby forming a color image. The printing paper sheet 205 on which the image is printed in this manner is discharged onto a stacker tray 211 to be stacked thereon.

The printing apparatus 210 of this embodiment further includes the convey unit 206, ink cartridges (not shown) for supplying inks to the printheads 201 to 204, a pump unit (not shown) for supplying inks to the printheads 201 to 204 and performing recovery operation, and a control board (not shown) for controlling the overall printing apparatus 210. A front door 209 is a door for the replacement of ink cartridges.

Figure 3:
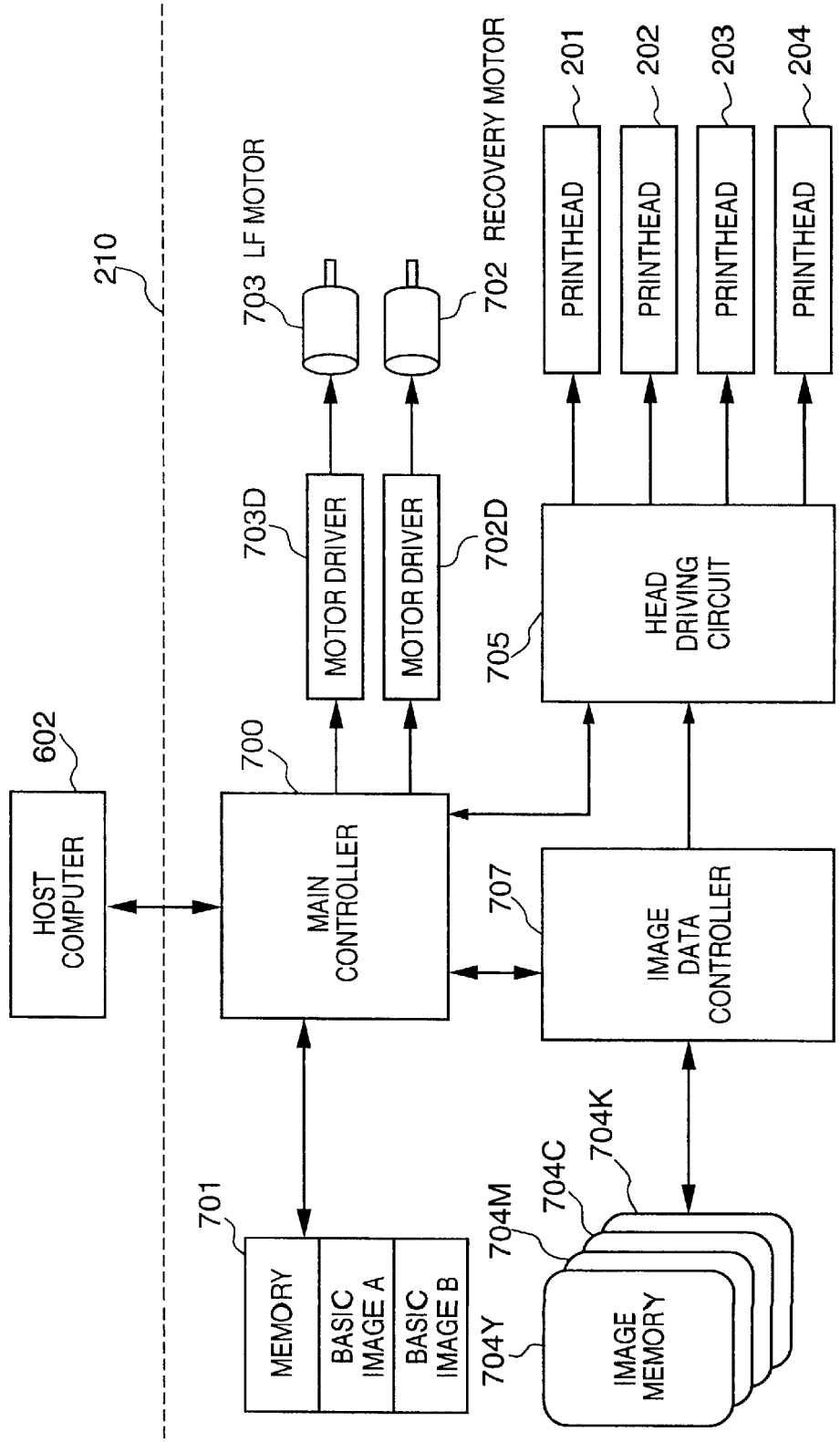
FIG. 3 is a block diagram showing the arrangement of the inkjet printing apparatus according to the first embodiment.

FIG. 3 is a block diagram showing the arrangement of the printing apparatus 210 of this embodiment.

Referring to FIG. 3, reference numeral 700 denotes a main controller for controlling the overall printing apparatus 210 in accordance with the control programs stored in a memory 701. In addition to the control programs, the memory 701 stores various image data such as basic image data (to be described later) and the like. Reference numeral 702 denotes a motor for driving each printhead recovery mechanism and the like; and 703, a paper feed motor (LF motor) for conveying a printing paper sheet. These motors are respectively driven by motor drivers 702D and 703D on the basis of instructions from the main controller 700. Reference numerals 704Y to 704K respectively denote image memories for storing the image data of yellow component, the image data of a magenta component, the image data of a cyan component, and the image data of a black component. Data are written/read in/from these image memories under the control of an image data controller 707. A head driving circuit 705 drives the printheads corresponding to image data of the respective colors on the basis of the image data sent from the image data controller 707 under the control of the main controller 700, thereby printing an image.

As will be described later, a host computer (to be referred to as a host hereinafter) 602 transmits basic images to be used for printing operation and stores them in the memory 701 of the printing apparatus in advance. The host 602 then designates the printing positions of the respective basic images on a printing paper sheet and gives an instruction to start printing processing.

With this operation, the printing apparatus 210 of this embodiment uses the function of the image data controller 707 to bitmap image data corresponding to the respective colors of the designated basic images at those addresses in the image memory 704 which correspond to the designated positions on the recording medium. When Y, M, C, and K image data are bitmapped in the image memory 704 in this manner, the main controller 700 drives the LF motor 703 for conveying a printing paper sheet to start conveying the printing paper sheet. The image data controller 707 sequentially reads out the image data of the corresponding colors from the image memory 704 in synchronism with the conveyance of this printing paper sheet, and sends the data to the printheads 201 to 204 for discharging inks of the respective colors through the head driving circuit 705. As a result, the printheads 201 to 204 discharge the inks in accordance with the sent image data, thereby printing a color image.

FIG. 4 is a block diagram showing the basic arrangement of a printed material vending machine using the printing apparatus 210 of this embodiment.

The host 602 inputs print information such as the name of a customer or a message, upon an operation performed by the customer, from a touch panel 604 mounted on a display unit for informing a message. In this case, the host 602 displays the message on the display unit of the touch panel 604. The customer selects a desired image or illustration on the touch panel 604. Thereafter, the input name or message is digitally synthesized with the selected image or illustration or the like to generate image data to be transmitted to the printing apparatus 210. The image data generated in this manner is transmitted to the printing apparatus 210 to print an image.

In this case, the host 602 binarizes only a basic image first, and then generates commands like those shown in FIG. 6. The host 602 transmits the basic image data to the printing apparatus 210, together with the printing position of the basic image and a print command, so as to print the image.

Referring to FIG. 4, reference numeral 601 denotes an uninterruptible power supply 601 for stably supplying power to the vending machine; 603, a coin discriminator for discriminating inserted coins to check whether a predetermined sum of money is inserted; and 606, a speaker for playing a BGM (background music) during printing operation of the printing apparatus 210 and generating voice patterns to give operation instructions to the customer.

Figure 5A:
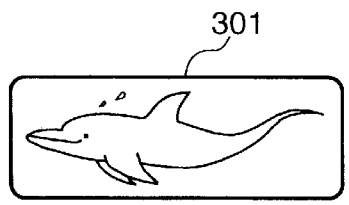
FIGS. 5A, 5B, and 5C are views showing basic images and print result on a recording medium in the first embodiment.
Figure 5B:
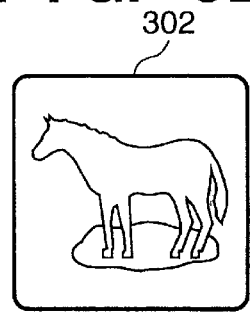
Figure 5C:
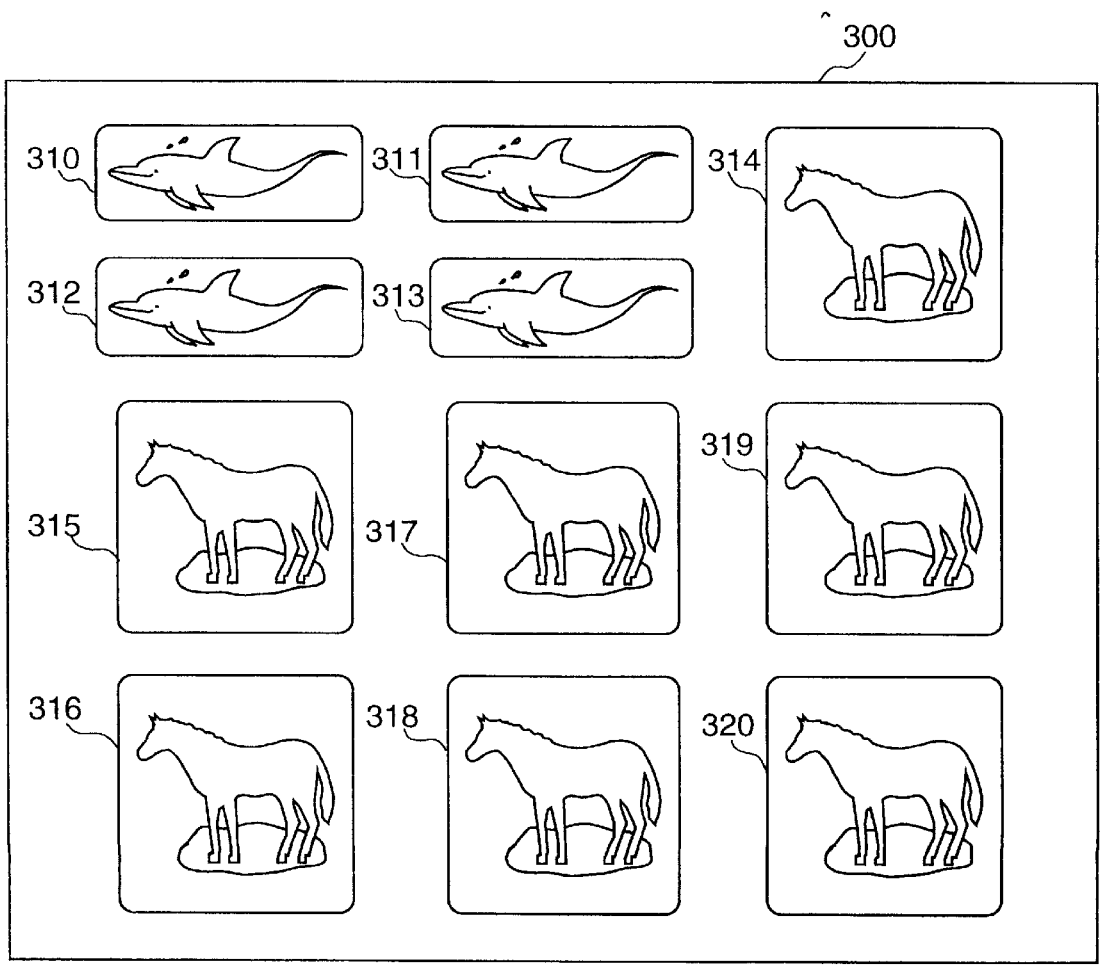

FIGS. 5A to 5C explain image samples to be printed by the printing apparatus of this embodiment and an example print.

FIGS. 5A and 5B respectively show basic images 301 and 302. FIG. 5C shows the example printed on a recording medium 300 upon synthesis of the basic images 301 and 302.

Referring to FIG. 5C, in this embodiment, the recording medium 300 has a size of 100 mm×100 mm; the basic image 301, a size of 15 mm×25 mm; and the basic image 302, a size of 20 m×20 mm. The total data amount of color image data, i.e., yellow (Y), magenta (M), cyan (C), and black (K) image data, required to print an image on the recording medium 300 is about 980 kbytes, providing that the print resolution is 360 dpi. When a conventional page printer is used to handle these image data and print an image, image data for one page must be transmitted from the host to the printing apparatus. In contrast to this, according to this embodiment, the data amount of image data to be transmitted from the host 602 to the printing apparatus 210 is as small as about 76 kbytes.

Printing processing in the printing apparatus 210 of this embodiment, which can greatly reduce the amount of data to be transmitted from the host in this manner, will be described below.

FIG. 6 is a view for explaining various commands to be transmitted from an image data source such as the host 602 to the printing apparatus 210. In this embodiment, each command is defined by an ESC sequence constituted by "ESC code", "[" (or "("), "lettercode", "cnt-LH" (or "cnt-HML"), and "object name" (only when needed).

Referring to FIG. 6, reference numeral 401 denotes a reset command for resetting the printing operation of the printing apparatus 210; 402, a paper size command for setting the size of a paper sheet to be used for printing operation; 403, a print count setting command for setting the number of print sheet(s); and 404, a command for designating image data to be transmitted from the host 602 to the printing apparatus 210 as bit image data or compressed image data. Note that, when the image data sent from the host 602 is compressed data, the printing apparatus 210 must have a decoding circuit for decompressing the compressed image data.

Reference numeral 405 denotes an image registration start command for designating the start of registration of the basic image 301; and 406 to 409, the image data (bit image: non-compressed data) of the yellow (Y), magenta (M), cyan (C), and black (K) components of the basic image 301. The image registration start command 405 includes image data size information. Upon reception of these commands 405 to 410, the printing apparatus 210 stores the image data of the four color (Y, M, C, K) components of the basic image 301 shown in FIG. 5A in a basic image area A in the memory 701.

Reference numeral 411 denotes an image registration start command for designating the start of registration of the basic image 302; and 412 to 415, the image data (bit image: non-compressed data) of the yellow (Y), magenta (M), cyan (C), and black (K) components of the basic image 302. Similar to the image registration start command 405, the image registration start command 411 includes image data size information. Upon reception of these commands 411 to 416, the printing apparatus 210 stores the image data of the four color (Y, M, C, K) components of the basic image 302 shown in FIG. 5B in a basic image area B in the memory 701.

Reference numeral 417 denotes a copy position designating command for designating the copy (printing) position on the recording medium 300. Upon reception of this command 417, the printing apparatus 210 bitmaps the image data of the respective color components of the basic image 301 at addresses, in the above image memories 704Y to 704K, which correspond to the respective printing positions to print the image data of the registered basic image 301 at a position, on the recording medium 300, which is designated by the copy position designating command 417. By printing based on the image data bitmapped in this manner, images 310 to 313 in FIG. 5C can be obtained.

Reference numeral 418 denotes a copy position designation command for designating the copy (printing) position of the basic image 302. As in the case of the command 417 described above, upon reception of the command 418, the printing apparatus 210 reads out the basic image 302 from the memory 701, and bitmaps the image data of the respective color components of the basic image 302 at addresses, in the image memories 704Y to 704K, which correspond to the positions designated by the copy position designation command 418. By printing based on the image data bitmapped in this manner, images 314 to 320 in FIG. 5C can be obtained. Reference numeral 419 denotes a printing start command for designating the start of printing of the image defined by the above commands.

If the image data received from the host 602 is compressed data, the data is stored in the compressed form as a basic image. Only when printing of the basic image is designated by a copy designation command, the basic image data is decompressed and bitmapped in the image memory 704. With this operation, the memory capacity for the storage of a basic image can be reduced.

Figure 7:
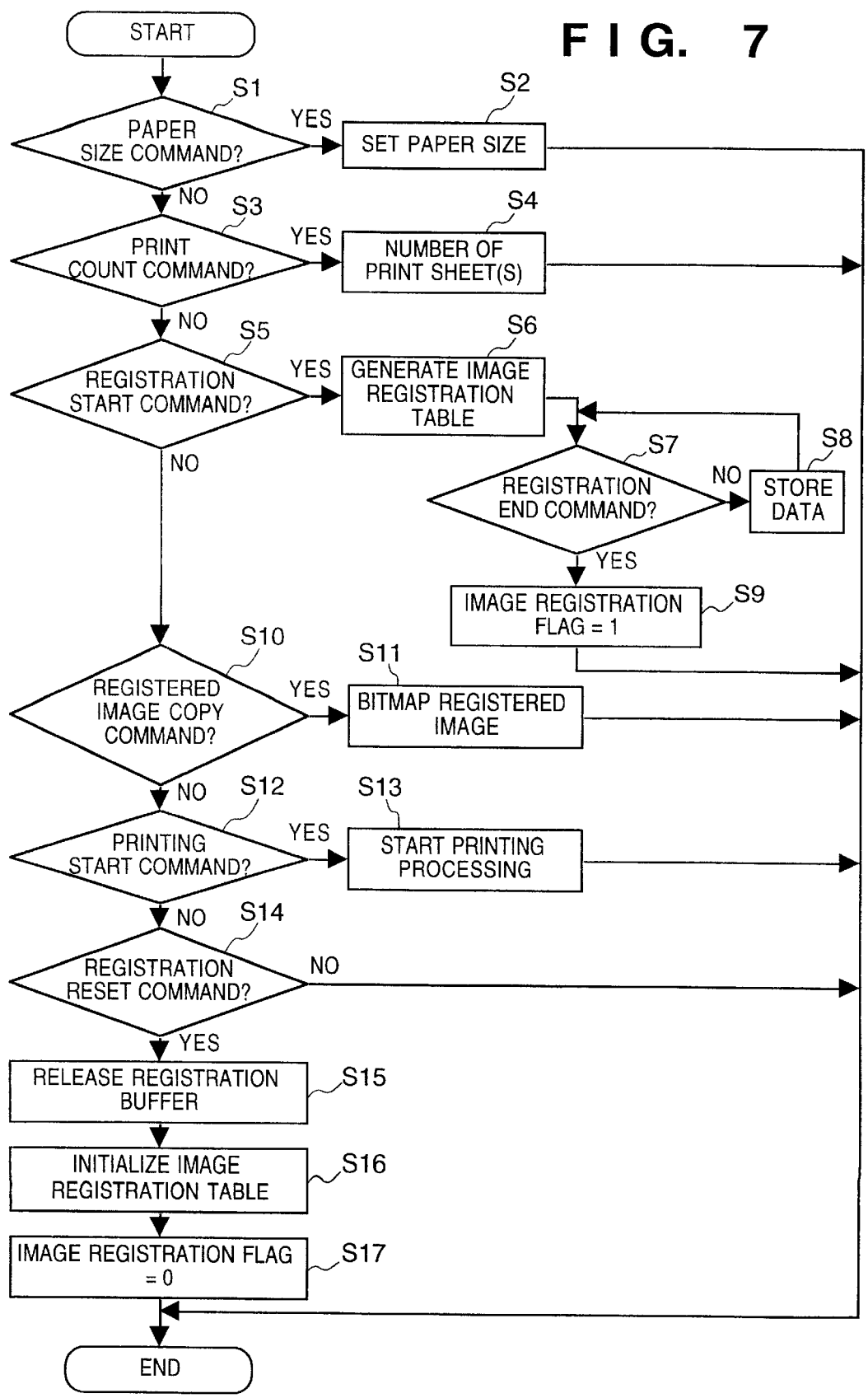
FIG. 7 is a flow chart showing command reception processing in the inkjet printing apparatus according to the first embodiment.

FIG. 7 is a flow chart showing reception processing, for data from the host 602, executed by the printing apparatus 210.

This processing is started when the printing apparatus 210 receives data from the host 602. Instep S1, it is checked whether or not the received data is the paper size command 402. If YES in step S1, the flow advances to step S2 to store the paper size information in the memory 701. If NO in step S1, the flow advances to step S3 to check whether or not the received data is the print count setting command 403. If YES in step S3, the flow advances to step S4 to set the number of print sheet(s) designated by this command in the memory 701.

If it is determined in step S3 that the received data is not the print count setting command 403, the flow advances to step S5 to check whether or not the received data is the image registration start command 405 (411). If YES in step S5, the flow advances to step S6 to generate a registration table for the designated image data in the memory 701. In step S7, it is checked whether or not a registration end command is received. If NO in step S7, the flow advances to step S8 to store the subsequent data until the reception of a registration end command is confirmed. If YES in step S7, i.e., if the registration of the image data is complete, the flow advances to step S9 to turn on a flag indicating the registration of the image data in the table.

If it is determined in step S5 that the received data is not the image registration start command 405 (411), the flow advances to step S10 to check whether or not the received data is the copy command 417 (418) for registered image data. If YES in step S10, the flow advances to step S11 to execute bitmapping for printing the image data for which copy operation is designated. This processing will be described in detail with reference to the flow chart of FIG. 8. If NO in step S10, the flow advances to step S12 to check whether or not the received data is a printing start command.

If the reception of a printing start command is confirmed, the flow advances to step S13 to start printing processing such as starting to convey a printing paper sheet, and the image data bitmapped in the image memories 704Y to 704K are output to the printheads 201 to 204, thereby printing an image.

If it is determined that the received data is none of the above commands, the flow advances to step S14 to check whether or not the received data is a reset command for resetting registered image data. If YES in step S14, the flow advances to step S15 to release the table area in which the designated image data is stored. In step S16, the image data stored in this area is cleared, and the table is initialized. In step S17, the registration flag for the image data is turned off. In contrast to this, if it is determined that the received data is not a reset command either, it is determined that the received data is not associated with printing processing, and the processing is terminated.

Bitmapping in step S11 will be described in detail next.

Figure 8:
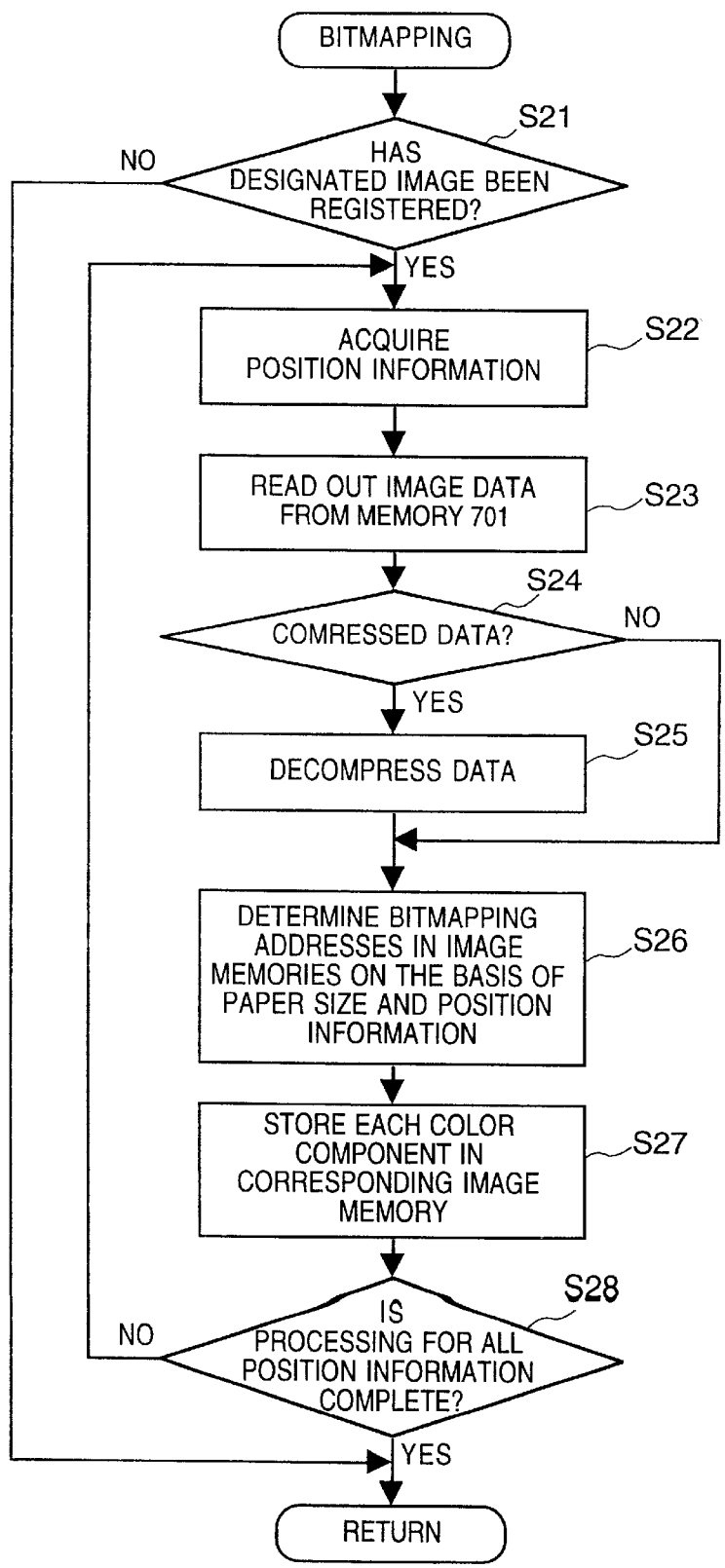
FIG. 8 is a flow chart showing image bitmapping processing in the inkjet printing apparatus according to the first embodiment.

FIG. 8 is a flow chart showing bitmapping executed by the printing apparatus 210.

In step S21, the printing apparatus 210 checks whether or not the registration flag for the designated image data is turned on, thereby checking whether or not the image data is registered in the memory 701. If it is determined that the registration flag is turned off, i.e., the designated image data is not registered, the processing is terminated without performing any processing. If it is determined that the designated image data is registered in the table in the memory 701, the flow advances to step S22 to acquire the copy position designated by the copy position designating command 417 (418). In step S23, the image data is read out from the table in the memory 701. In step S24, it is checked whether or not the image data is stored in the compressed form. If YES in step S24, the flow advances to step S25 to decompress the compressed image data. If NO in step S24, the flow skips step S25 and advances to step S26.

When the designated image data is obtained in this manner, the bitmapping addresses in the image memory 704 are determined in step S26 on the basis of the paper size designated by the host 602 and the image copy position information designated by the command 417 (418). Instep S27, the respective color components of the image data are stored at the corresponding bitmapping addresses in the image memories 704Y to 704K corresponding to the respective determined colors. Thereafter, the flow advances to step S28 to check, if a plurality of position information are designated, whether or not bitmapping of the image data corresponding to all of the position information is complete. If NO in step S28, the flow returns to step S22 to acquire the next position information and execute bitmapping processing similar to the above processing.

Although omitted from the flow chart of FIG. 8, other data such as the operator's name inputted by the operator or various messages, as needed, are bitmapped and stored in the image memories corresponding to the designated color components.

With this operation, the respective color components of the designated image data are stored at those addresses, in the image memories 704Y to 704K, which correspond to the positions designated by the position designation command. In this manner, the respective color components of the image to be actually printed are stored in the image memories 704Y to 704K.

The processing on the host 602 side will be described next.

Figure 9:
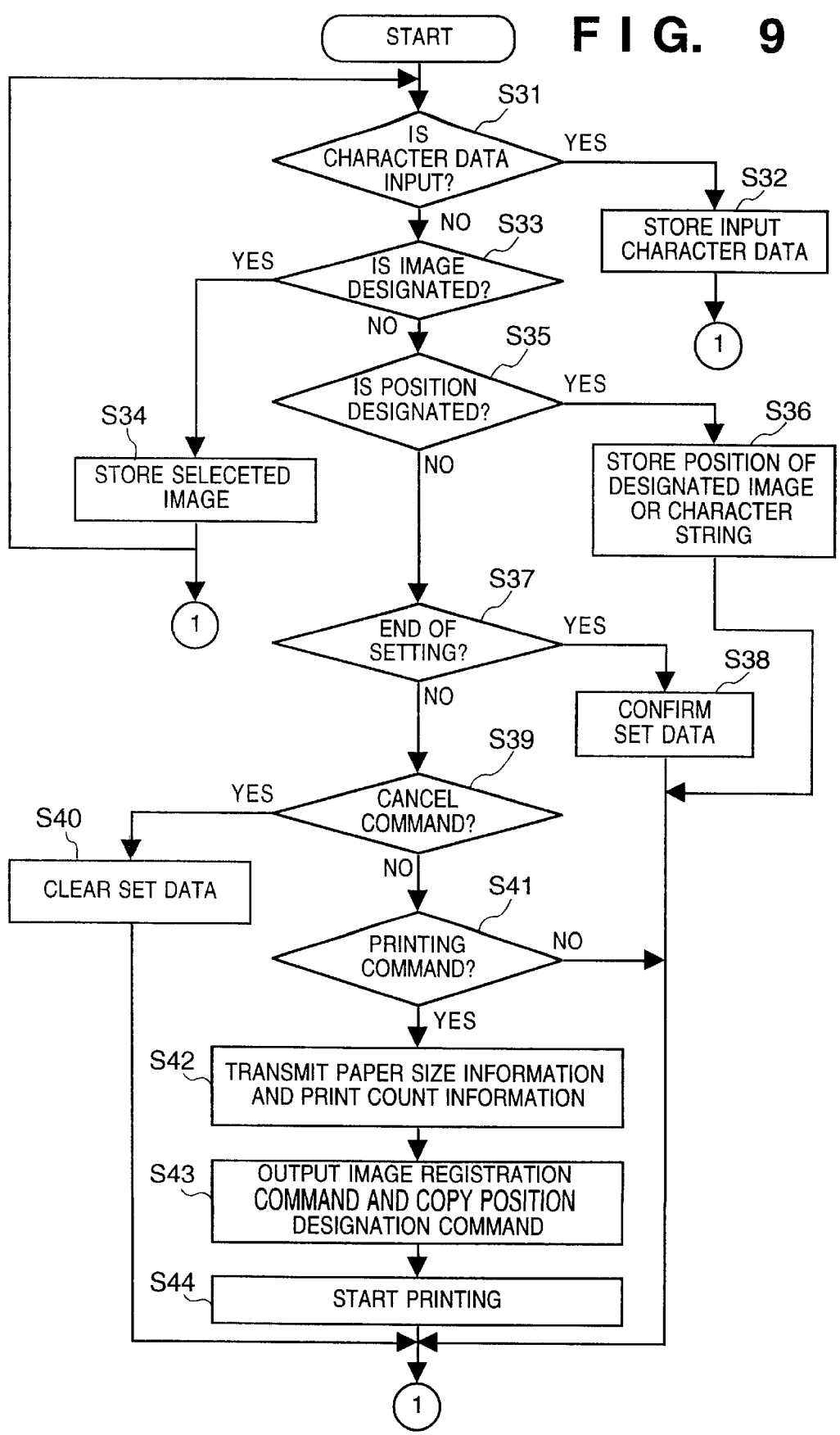
FIG. 9 is a flow chart showing processing in the host computer in the first embodiment.

FIG. 9 is a flow chart showing the processing in the host 602.

In step S31, it is checked whether or not character information such as an operator's name is inputted from the touch panel 604. If YES in step S31, the flow advances to step S32 to store the inputted character information in the memory of the host 602. Then, the flow returns to step S31 again. If NO in step S31, the flow advances to step S33.

In step S33, it is checked whether or not an image (basic image) to be printed is designated from the touch panel 604. If YES in step S33, the flow advances to step S34 to store information for specifying the designated image (basic image). After that, the flow returns to step S31 again. If NO in step S33, the flow advances to step S35.

In step S35, it is checked whether or not the printing position of the designated image is designated or the printing position of character information (operator's name, message, or the like) inputted in step S32 is designated. If YES in step S35, the flow advances to step S36 to store the printing position of the designated image or character information. The flow returns to step S31 again. If NO in step S35, the flow advances to step S37.

In step S37, it is checked whether or not the operator of the touch panel 604 has completed various setting operations. If YES in step S37, the flow advances to step S38 to confirm various data which have been set. For example, the data to be confirmed in this case include the paper size, the number of print sheet(s) to be printed, the content of character data, the printing position of the character data, the content of image (basic image) data, and the printing position of the image data. Thereafter, the flow returns to step S31 again. If NO in step S37, the flow advances to step S39.

In step S39, it is checked whether or not a cancel command is inputted by the operator from the touch panel 604. If YES in step S39, the flow advances to step S40 to clear the various data which have been set. The flow then returns to step S31 again. If NO in step S39, the flow advances to step S41.

If it is determined in step S41 that a print command is inputted, the flow advances to step S42 to transmit the set information such as the paper size and the number of print sheet(s) to be printed to the printing apparatus 210. The flow, then, advances to step S43 to generate registration commands (405 to 410 or 411 to 416) on the basis of the designated image (basic image) and transmit these commands to the printing apparatus 210. The image data such as the character data are also transmitted, as needed. In addition, the copy position designating command 417 (418) for the image data is generated and transmitted to the printing apparatus 210. Thereafter, the flow advances to step S44 to transmit the printing start command 419 to the printing apparatus 210. In response to these commands, the printing apparatus 210 starts to execute the processing shown in the flow chart of FIG. 7 described above.

If it is determined in step S41 that no print command is inputted, the flow returns to step S31 again to wait for an input command. After the processing in step S44, the flow returns to step S31 to wait for an input command.

As described above, according to this embodiment, if image information to be printed on one print sheet includes identical image data, the image data is temporarily stored in the memory of the printing apparatus. In addition, the stored image data can be bitmapped at the position based on the copy position information sent from the host, and the resultant image can be printed. With this operation, even when identical image data are to be used and printed on one page at once, the corresponding images can be printed without repeatedly transmitting the image data. This can also shorten the time required for transferring the image data from the host to the printing apparatus.

In the case shown in FIGS. 5A to 5C, only the data respectively corresponding to the basic images 301 and 302 are actually transferred from the host to the printing apparatus, and hence the image data transfer time can be greatly shortened.

Even in a case wherein image data to be printed are binarized in the host, since binarization processing for all the image data to be printed on a recording medium is not required, printing operation can be performed at higher speed.

Obviously, the number of basic images like those described above and commands and the like to be transmitted from the host to the printer apparatus are not limited to those in this embodiment.

<Second Embodiment>

Figure 10:
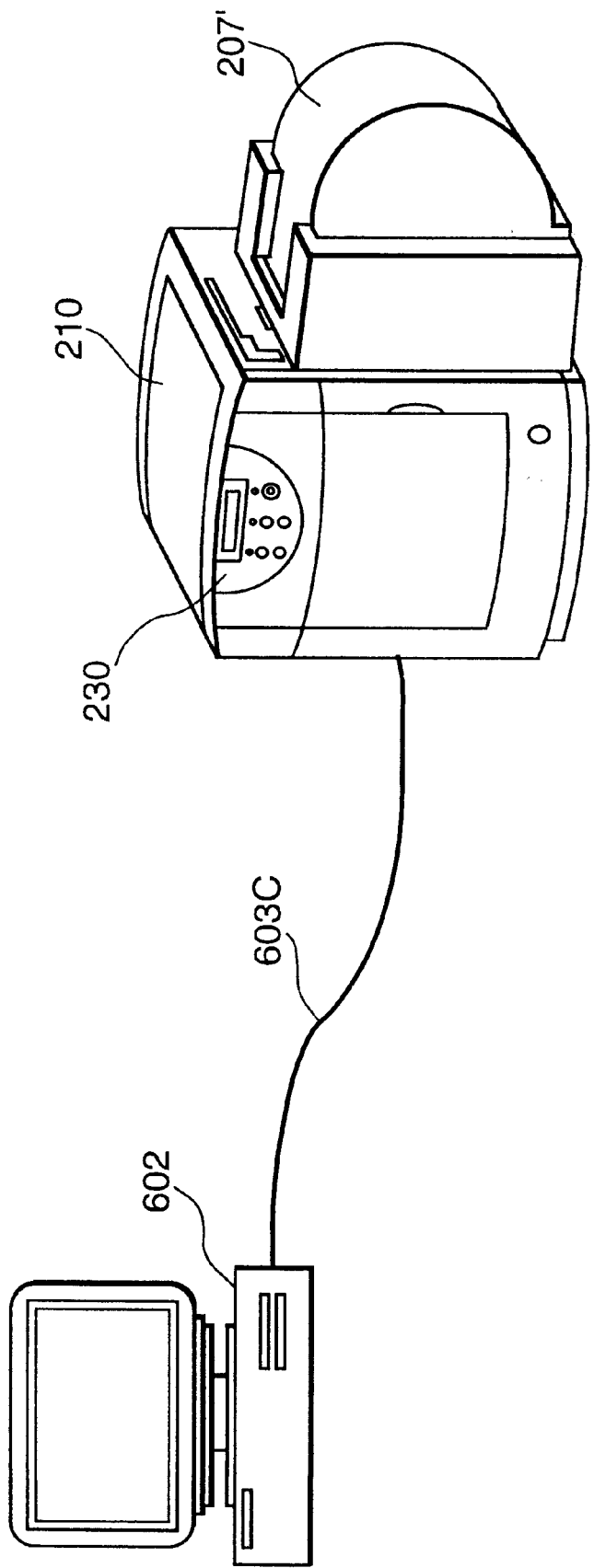
FIG. 10 is a perspective view showing the schematic arrangement of a printer system according to a second embodiment of the present invention.

FIG. 10 is a perspective view showing a printer system including a color printing apparatus (to be referred to as a printing apparatus hereinafter) having full-line printheads each having a printing width corresponding to the width of a recording medium and designed to print in accordance with an inkjet method, and a host computer (host) for supplying print data to the printing apparatus, according to a second embodiment of the present invention.

As shown in FIG. 10, a printing apparatus 210 and a host 602 are connected to each other through a cable 603C. The printing apparatus 210 prints images on a paper roll loaded in a paper roll folder 207' on the basis of the print data supplied from the host 602. The printing apparatus 210 also includes a control panel 230 which displays the state of the apparatus and is used to set various operation conditions.

Figure 11:
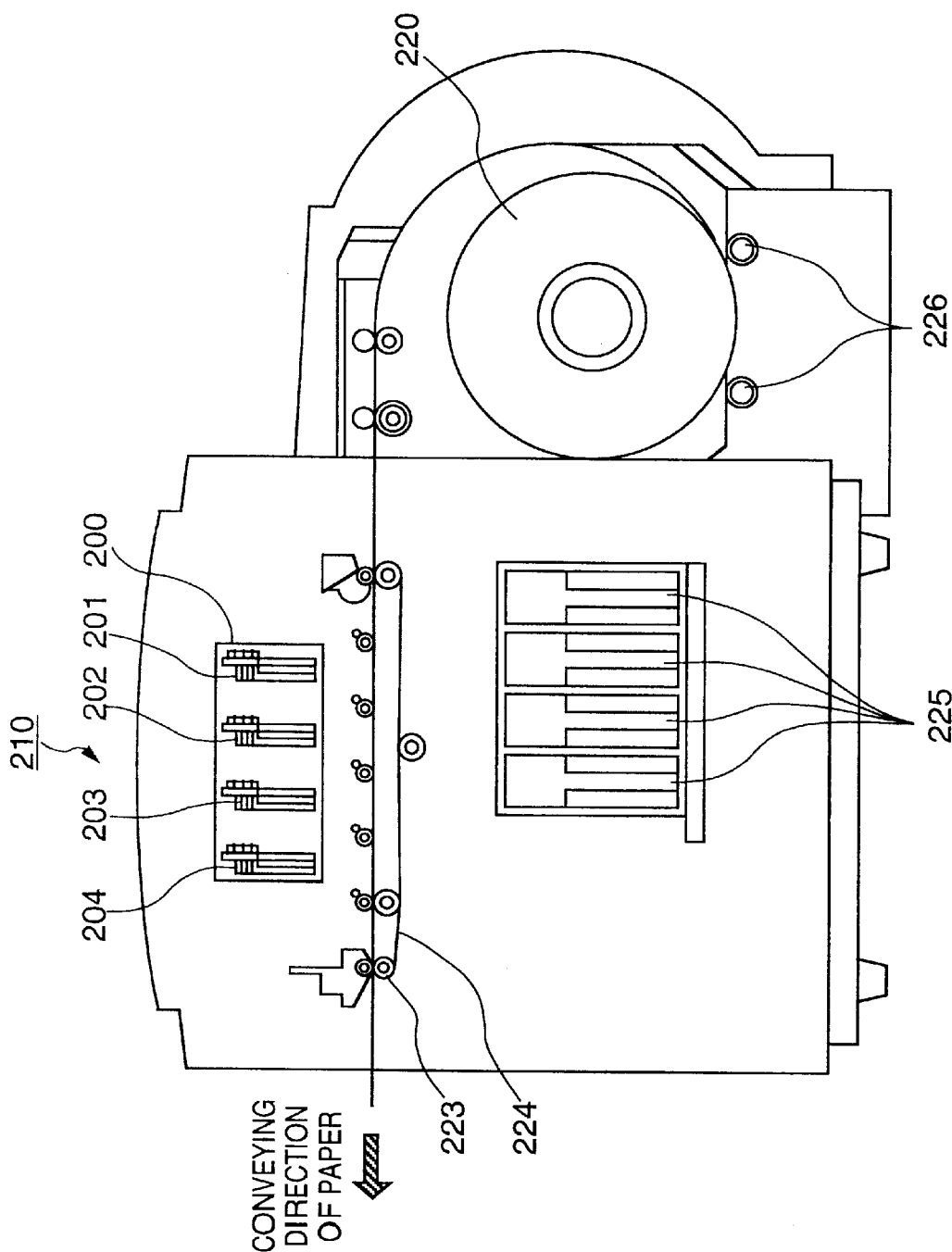
FIG. 11 is a cross-sectional view showing the internal structure of a printing apparatus 210.

FIG. 11 is a cross-sectional view showing the internal structure of the printing apparatus 210.

The printing apparatus 210 prints as follows. A paper roll 220 as a recording medium loaded in the paper roll folder 207' is fed into the printing apparatus by paper roll convey rollers 226. In the apparatus, the paper roll 220 is conveyed by convey rollers 223 and a convey belt 224 in the direction indicated by the arrow. The printing apparatus also includes a head unit 200 incorporating four full-line printheads 201, 202, 203, and 204 for respectively discharging black (K), cyan (C), magenta (M), and yellow (Y) inks, and prints a color image on the paper roll 220 by using the inks supplied from four ink cartridges 225 containing the Y, M, C, and K inks.

Figure 12:
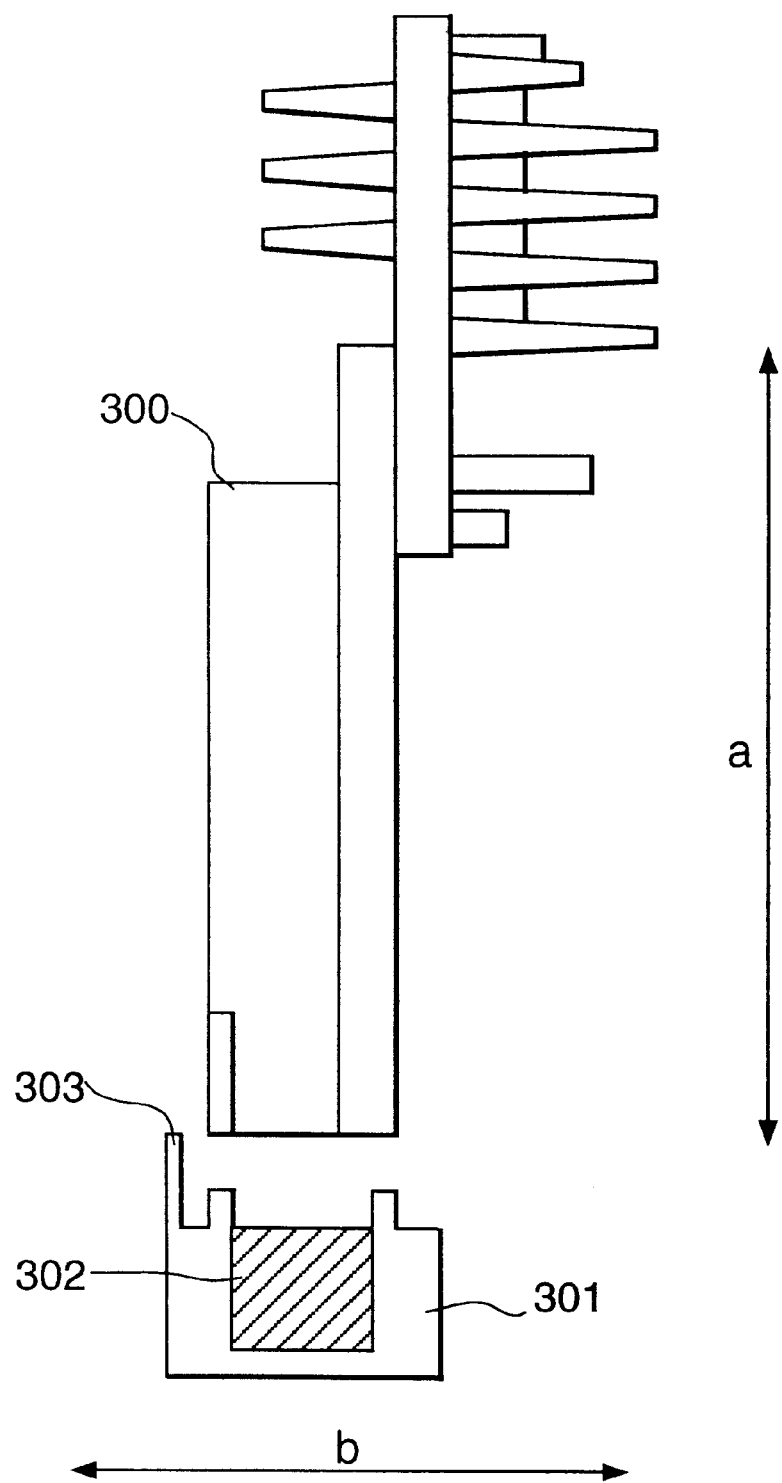
FIG. 12 is a sectional view of a head unit 200.

FIG. 12 is a sectional view of the head unit 200.

As described above, the four full-line printheads are incorporated in the head unit 200. Since these printheads have the same structure, FIG. 12 shows one of the printheads as a representative.

As shown in FIG. 12, the head unit 200 incorporates four printheads 300 capable of moving in the vertical direction (indicated by an arrow a) and four recovery units 301 capable of moving in the horizontal direction (indicated by an arrow b). Each recovery unit 301 has a cleaner blade 303 for cleaning the ink discharge surface of the printhead and incorporates an absorber 302 for absorbing ink discharged from the printhead to clean it.

Figure 13:
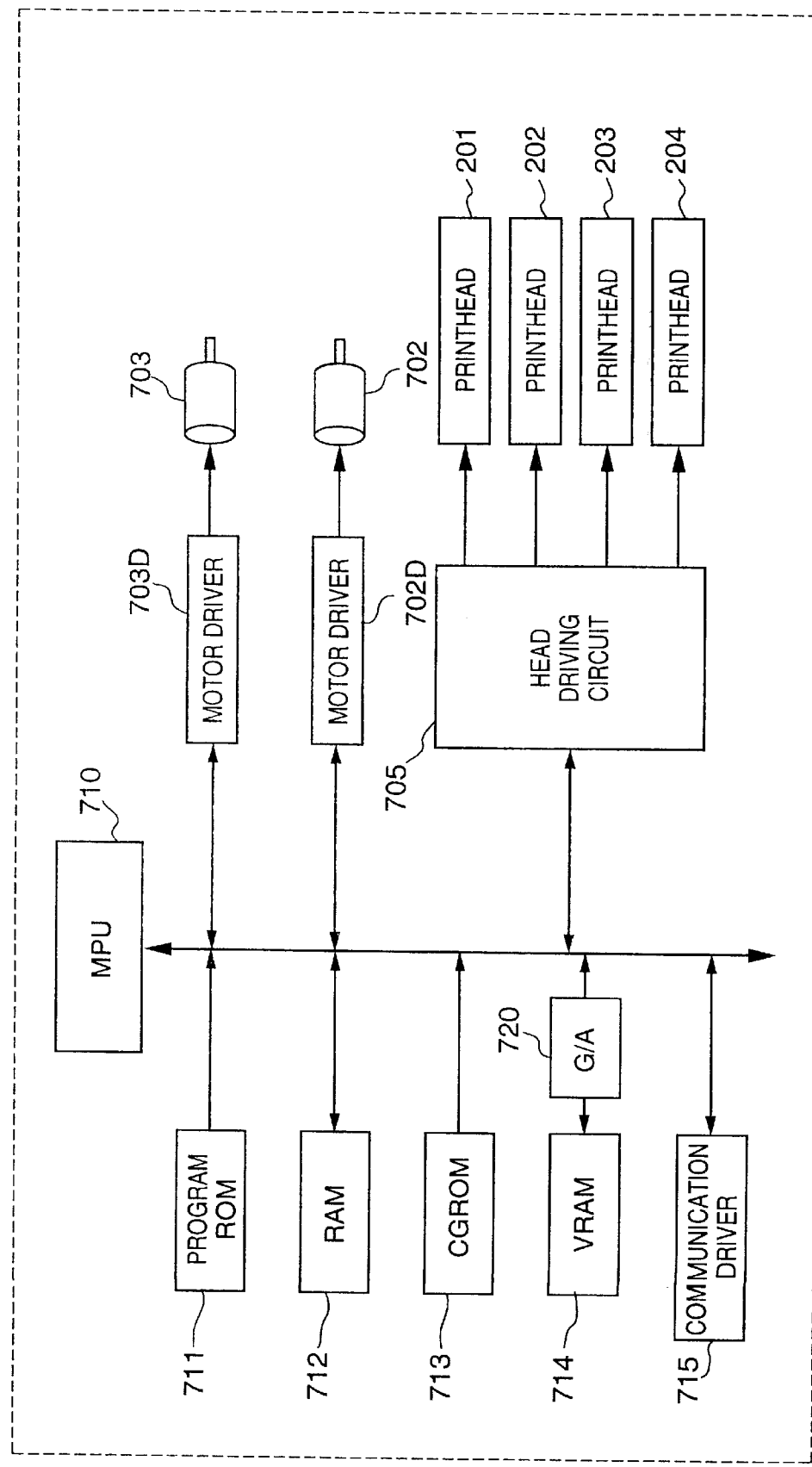
FIG. 13 is a block diagram showing the arrangement of the control circuit of the printing apparatus.

FIG. 13 is a block diagram showing the arrangement of the control circuit of the printing apparatus. Note that the same reference numerals in FIG. 13 denote the same parts as in the first embodiment, and a description thereof will be omitted.

Referring to FIG. 13, reference numeral 710 denotes an MPU for controlling the overall apparatus; 711, a program ROM storing various control programs to be executed by the MPU 710; 712, a RAM used as a work area when the MPU 710 executes a control program; 713, a CG-ROM storing font information for printing; 714, a VRAM used as a print buffer in which print data corresponding to one printing paper sheet is bitmapped; and 715, a communication driver serving an interface with the host.

Part of the VRAM 714 is used as a data registration area. The VRAM 714 is designed to store the respective color components, i.e., Y, M, C, and K components, of print data in different buffer frames.

Reference numeral 720 denotes a gate array (G/A) having an interface function between the VRAM 714 and the MPU 710, a copy function in the VRAM 714, and the like. Although the gate array (G/A) 720 executes various functions in accordance with instructions from the MPU 710, the gate array (G/A) 720 can operate independently of the MPU 710.

Figure 14:
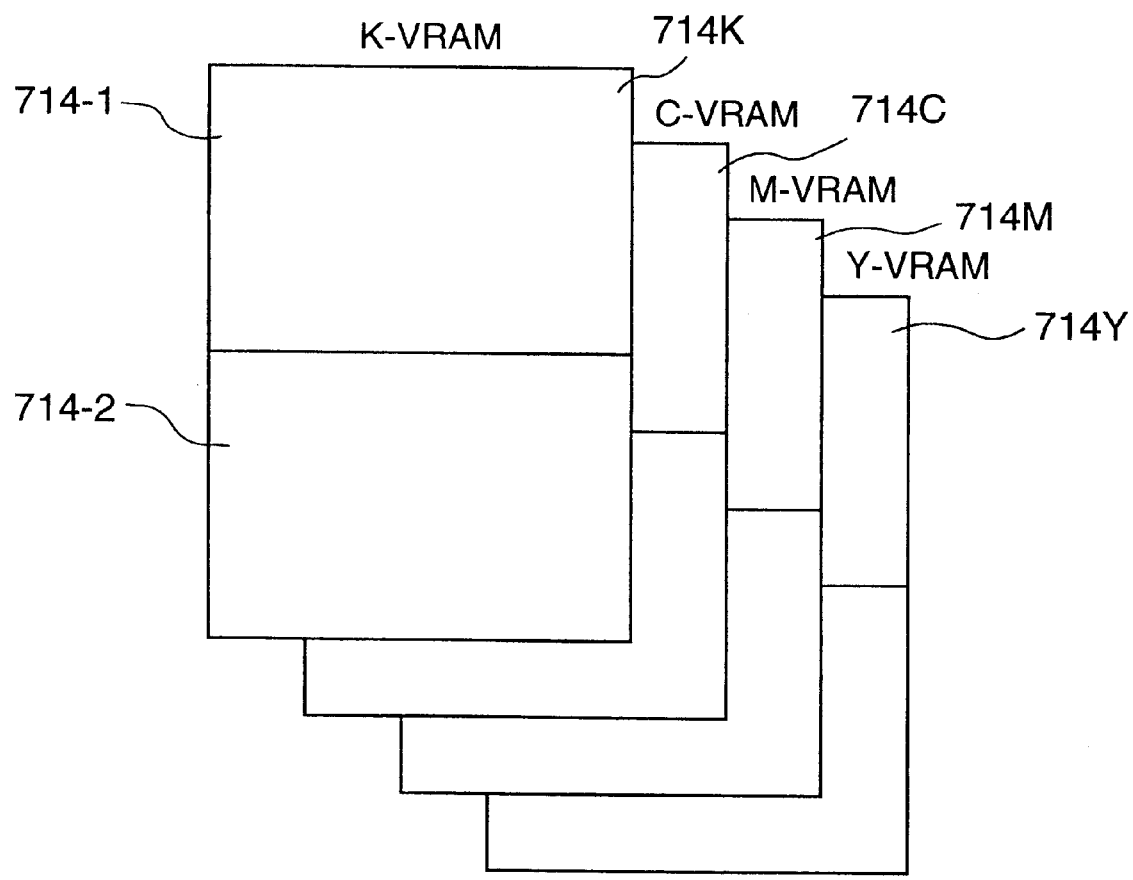
FIG. 14 is a view showing the arrangement of a print buffer.

FIG. 14 shows the arrangement of a print buffer.

As described above, the VRAM 714 has a print buffer 714-1, in which print data is bitmapped and stored in units of color components, i.e., Y, M, C, and K components, and an image registration buffer 714-2. Referring to FIG. 14, reference numerals 714K, 714C, 714M, and 714Y respectively denote a K component buffer frame (K-VRAM), a C component buffer frame (C-VRAM), an M component buffer frame (M-VRAM), and a Y component buffer frame (Y-VRAM).

FIG. 15 shows the commands used to execute printing operation.

As shown in FIG. 15, these commands are classified as follows in accordance with their functions: (1) a setting command, (2) a raster image command, (3) a coordinate update command, (4) a printing start command, (5) a registration start command, (6) a registration end command, and (7) a registered image copy command. These commands are identified by the identification codes at the heads of the commands. Each command will be described below.

(1) Setting Commands

These commands include a paper size setting command 500 for designating the size of a paper sheet to be used, and a print count setting command 501 for designating a desired number of paper sheets to be printed.

(2) Raster Image Command

This command is a command (raster image command 502) for storing print data as bit image data in its operand in units of rasters.

(3) Coordinate Update Commands

These commands include a raster skip command 503 for updating the Y-coordinate value in the X-Y coordinate system which expresses the address of bitmapped image data, and a CR (Carriage Return) command 504 for returning the X-coordinate value to the origin.

(4) Printing Start Command

This command is a command (printing start command 505) for instructing print start.

(5) Registration Start Command (Image Registration Command)

This command is a command (registration start command 506) for handling the raster image command 502 received until the reception of a registration end command as a data registration area, and registering it at a designated registration number.

(6) Registration End Command

This command is a command (registration end command 507) for designating end of the above registration.

(7) Registered Image Copy Command

This command is a command (registered image copy command 508) for copying the registered image of the designated registration number to a plurality of designated coordinates.

Upon the reception of these commands from the host, a command reception processing is executed in the printing apparatus in accordance with the following procedure.

Figure 16:
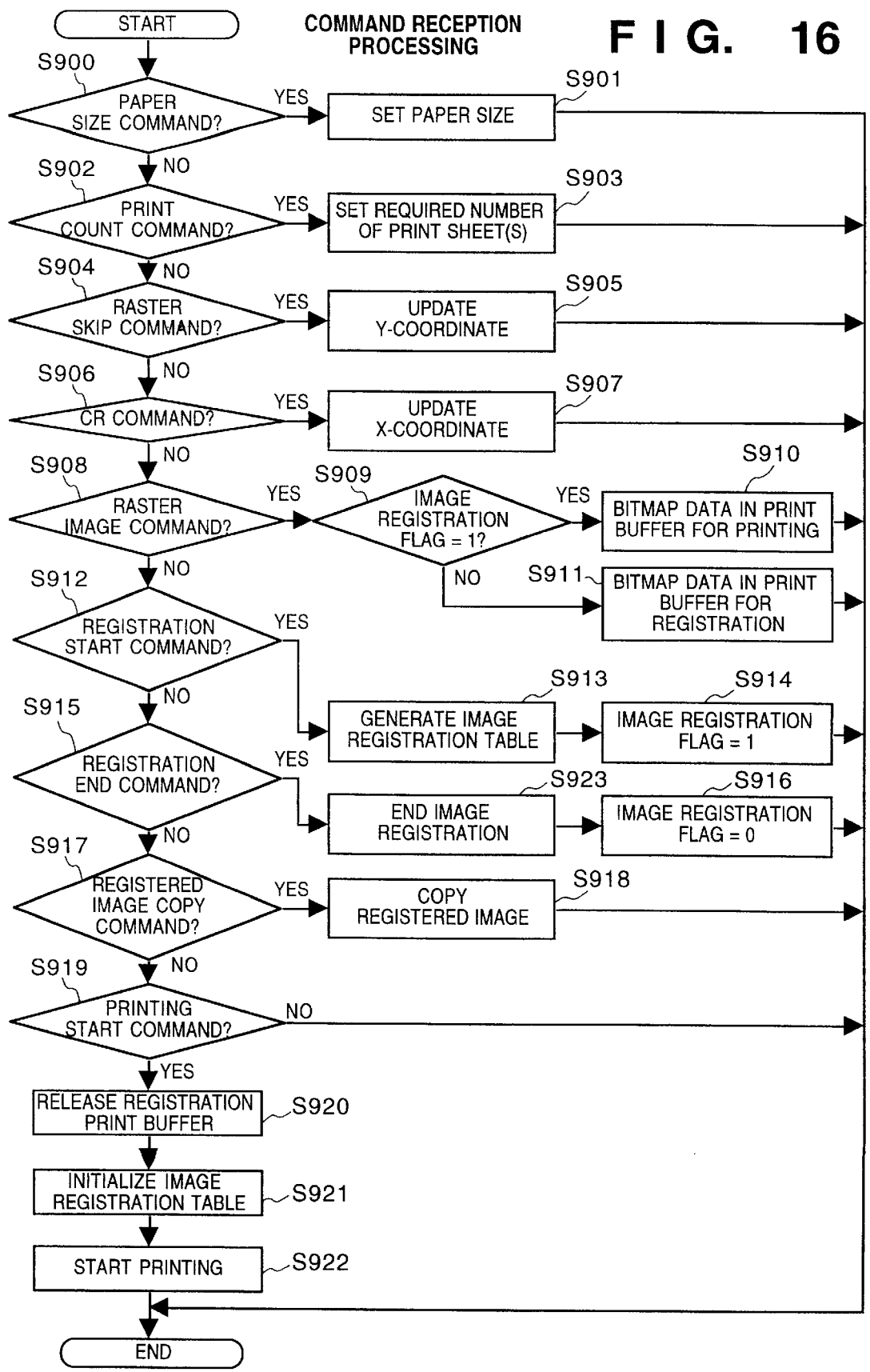
FIG. 16 is a flow chart showing received command processing.

FIG. 16 is a flow chart showing received command processing.

According to this flow chart, it is checked in step S900 whether or not the received command is the "paper size command". If YES in step S900, the flow advances to step S901 to execute paper size setting processing. Thereafter, the received command processing is terminated. If NO in step S900, the flow advances to step S902 to check whether or not the received command is the "page count command". If YES in step S902, the flow advances to step S903 to execute required print paper sheet setting processing. The received command processing is then terminated.

If NO in step S902, the flow advances to step S904 to check whether or not the received command is the "raster skip command". If YES in step S904, the flow advances to step S905 to execute Y-coordinate value update processing. After that, the received command processing is terminated. If NO in step S904, the flow advances to step S906 to check whether or not the received command is the "CR command". If YES in step S906, the flow advances to step S907 to execute X-coordinate value update processing. The received command processing is then terminated.

If NO in step S906, the flow advances to step S908 to check whether or not the received command is the "raster image command". If YES in step S908, the flow advances to step S909 to confirm whether or not image data has been registered. This processing is performed by checking the value of an internally set flag (FLG). More specifically, if FLG="1", the flow advances to step S910 to bitmap the bit image data set in the "raster image command" into the print buffer 714-1. In contrast to this, if FLG="0", the flow advances to step S911 to bitmap the bit image data set in the "raster image command" into the image registration buffer 714-2. Upon completion of the processing in step S910 or S911, the received command processing is terminated.

In contrast to this, if it is determined that the received command is not the "raster image command", the flow advances to step S912 to check whether or not the received command is the "registration start command". If YES in step S912, the flow advances to step S913 to generate an image registration table (to be described later). In step S914, the value of FLG is set to "1". Then, the received command processing is terminated.

However, if it is determined that the received command is not the "registration start command", the flow advances to step S915 to check whether or not the received command is the "registration end command". If YES in step S915, the flow advances to step S923 to terminate the image registration processing In step S916, the value of FLG is set to "0". The received command processing is, then, terminated.

On the other hand, if NO in step S915, the flow advances to step S917 to check whether or not the received command is the "registered image copy command". If YES in step S917, the flow advances to step S918 to copy the registered image to one or a plurality of designated coordinate positions in accordance with the coordinates written in the operand of this command. Thereafter, the received command processing is terminated.

In contrast to this, if NO in step S917, the flow advances to step S919 to check whether or not the received command is the "print start command". If YES in step S919, the flow advances to step S920 to clear the image registration buffer 714-2 to "0" to release the buffer. In addition, in step S921, the image registration table is initialized, and printing processing is started. Thereafter, the processing is terminated.

But if it is determined that the received command is not the "print start command" either, the processing is terminated.

Buffer bitmapping processing in the printing apparatus having the above arrangement will be described next with reference to FIGS. 17 to 25.

Figure 17:
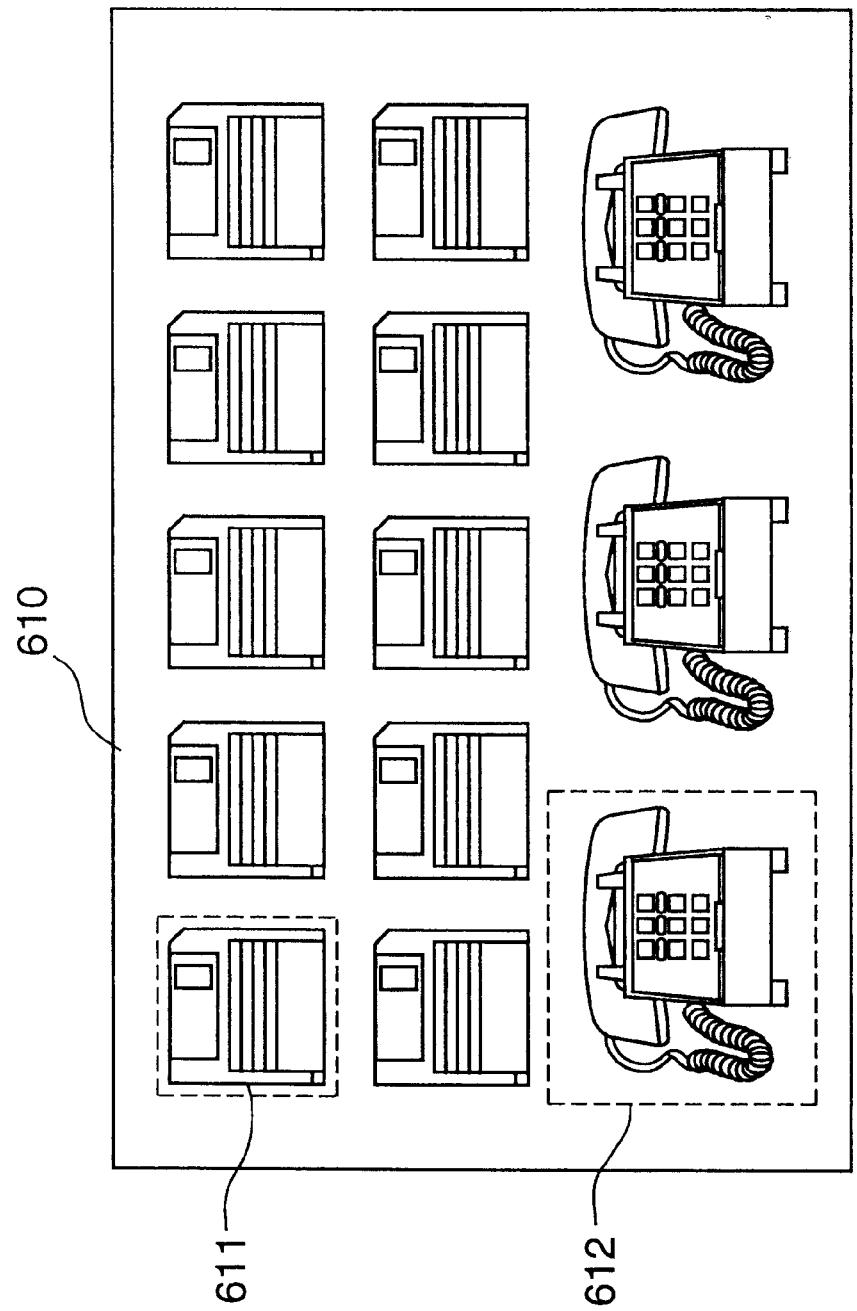
FIG. 17 is a view showing a print result obtained by the printing apparatus 210.

FIG. 17 shows a print result printed by the printing apparatus 210.

As shown in FIG. 17, a plurality of basic images 611 and a plurality of basic images 612 are printed on one printing paper sheet 610.

The processing required to obtain the print result shown in FIG. 17 will be described in detail below in comparison with a reference.

Figure 18:
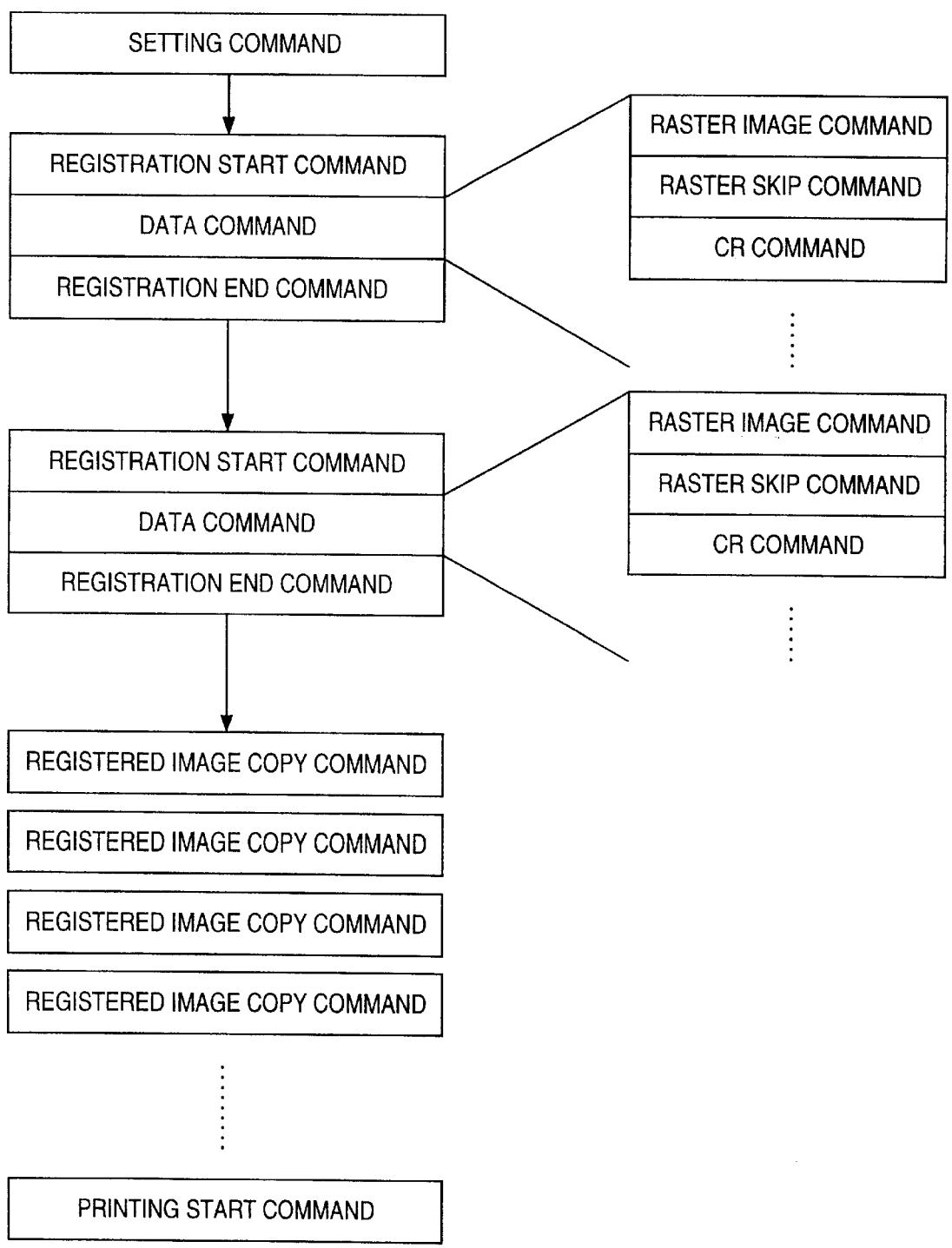
FIG. 18 is a view showing a conventional command processing sequence.

According to the reference, when a plurality of identical patterns are present on one printing paper sheet as in the case shown in FIG. 17, image data are registered first as shown in FIG. 18, i.e., command sequences, each constituted by a "registration start command", a "data command (raster image command, raster skip command, and CR command)", and a "registration end command", which are required to register the image data, are processed for the number of patterns first, the MPU 710 executes registered image copy commands, thereby bitmapping the image data in the VRAM. For this reason, it is desired that the buffer bitmapping efficiency corresponding to the first printing paper sheet to be printed out is improved.

Figure 19:
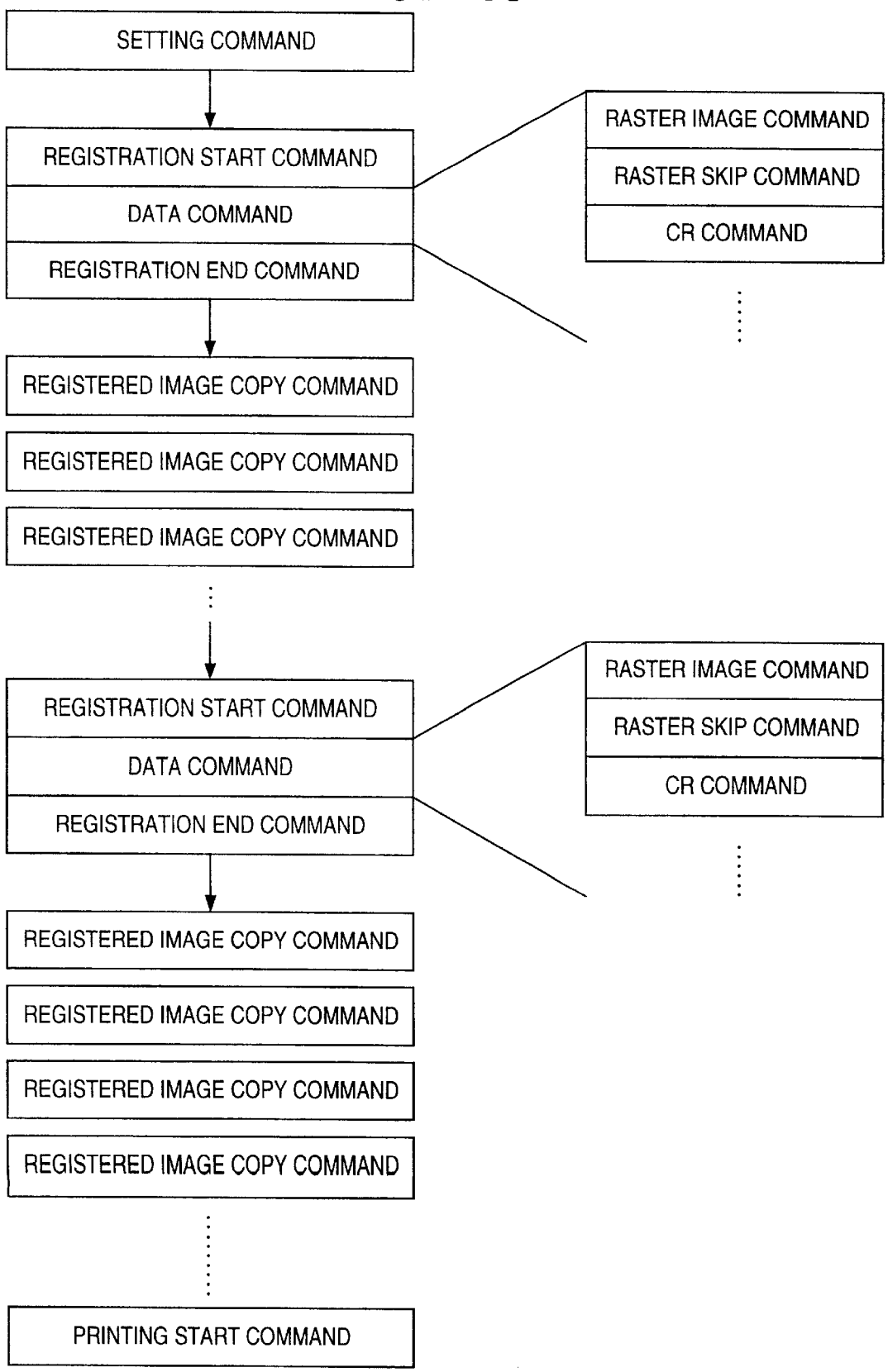
FIG. 19 is a view showing a command processing sequence according to the second embodiment.

In consideration of the above reference, in this embodiment, the command processing sequence is set as shown in FIG. 19. That is, a series of operations for each pattern from image data registration to buffer bitmapping are grouped as one command sequence so as to concurrently perform processing for each pattern.

A detailed sequence of processing for obtaining the print result shown in FIG. 17 as an example will be described below with reference to FIGS. 20 to 25.

FIGS. 20, 22, 24, and 25 show changes in the internal state of the print buffer with the progress of command processing. FIGS. 21 and 23 show the arrangement of an image management table which is generated or updated in step S913. This table is set in the RAM 712.

As shown in FIGS. 21 and 23, an image management table 800 has an image number column 801 in which numbers assigned to image data (to be managed) in the registration order are stored, an image start address column 802 in which the start addresses of the image data registered in the image registration buffer 714-2 are stored, and horizontal/vertical image size information columns 803 and 804 in which the horizontal and vertical sizes of the registered images are set.

Figure 20:
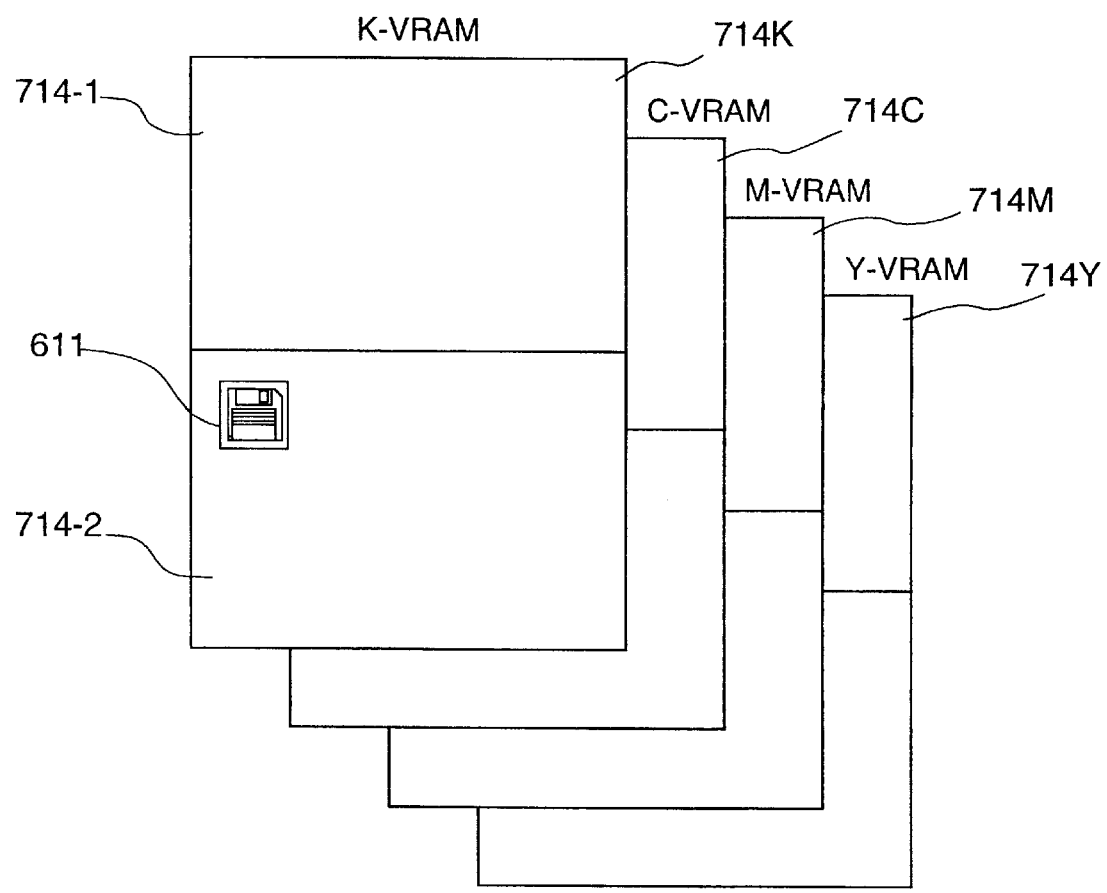
FIG. 20 is a view showing changes in the internal state of the print buffer with the progress of command processing.

First of all, registration of the basic image 611 is started on the basis of the image registration command transmitted from the host. More specifically, the printing apparatus stores image data expressing the basic image 611 in the image registration buffer 714-2, as shown in FIG. 20, and registers the start address and the horizontal and vertical sizes of the image, in the image management table 800, together with the image number ("1" in this case), as shown in FIG. 21, thereby managing the image data associated with the basic image 611.

Figure 22:
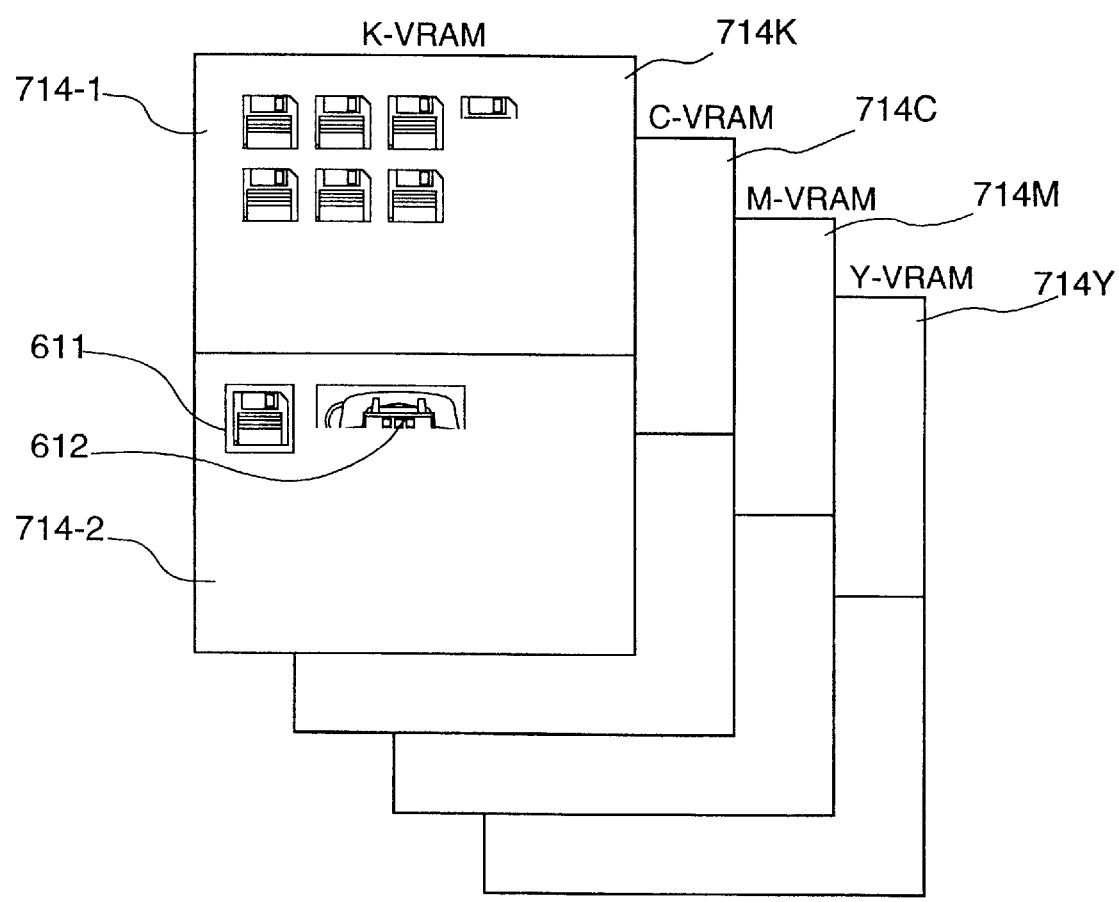
FIG. 22 is a view showing changes in the internal state of the print buffer with the progress of command processing.

When the registration of the basic image 611 is complete, a registered image copy command is transmitted from the host. Upon detection of this command, the MPU 710 instructs the gate array (G/A) 720 to perform copy operation in the VRAM 714, thereby copying the registered basic image 611 to addresses on the print buffer 714-1 which correspond to the coordinates (copy coordinates) designated by the command, as shown in FIG. 22. The MPU 710 can operate independently of the gate array (G/A) 720 during this copy operation, and hence analyzes the next command sent from the host. At this time, image data expressing the basic image 612 is sent from the host, as shown in FIG. 22.

In accordance with this operation, the printing apparatus stores the image data in the image registration buffer 714-2, and registers the start address and the horizontal and vertical sizes of the image in the image management table 800, together with the image number ("2" in this case), as shown in FIG. 23, thereby managing the image data associated with the basic image 612. At this time, copy operation associated with the basic image 611 is concurrently executed by the gate array (G/A) 720.

When the registration of the basic image 612 is complete, a registered image copy command is transmitted from the host. Upon detection of this command, the MPU 710 instructs the gate array (G/A) 720 to perform copy operation in the VRAM 714. As in the case of the basic image 611, the registered basic image 612 is copied to addresses on the print buffer 714-1 which correspond to the coordinates (copy coordinates) designated by the command, as shown in FIG. 24.

Figure 25:
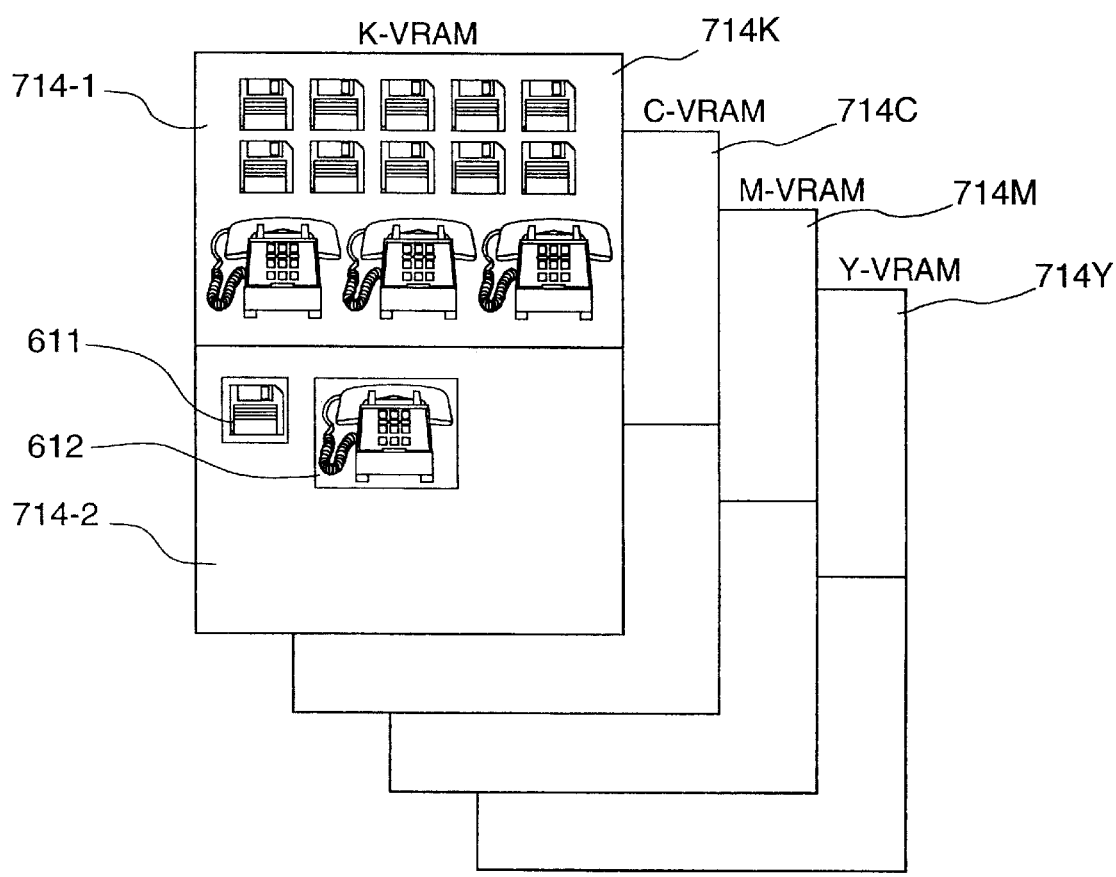
FIG. 25 is a view showing changes in the internal state of the print buffer with the progress of command processing.

Upon reception of a printing start command from the host, the printing apparatus prints after the copy operation is complete, i.e., the print buffer 714-1 is set in the state shown in FIG. 25.

For the sake of simple explanation, the above description of the image data is made without any reference to each color component. Obviously, however, the above bitmapping of image data in the buffer is executed for each of the following buffer frames: the K component buffer frame (K-VRAM) 714K, the C component buffer frame (C-VRAM) 714C, the M component buffer frame (M-VRAM) 714M, and the Y component buffer frame (Y-VRAM) 714Y.

According to the embodiment described above, therefore, a plurality of identical print patterns are printed on one printing paper sheet as follows. First of all, one of the patterns is bitmapped in a predetermined registration area in the buffer. The bitmapped image is then copied to the print buffer by a required number. At the same time, data about another one of the patterns is received from the host and bitmapped in a predetermined registration area, thus concurrently performing buffer bitmapping processing. As a result, the data bitmapping efficiency improves. Even if, therefore, only one printing paper sheet is to be output after images are printed thereon, the data bitmapping time can be further shortened.

The above embodiment has exemplified the case wherein a full-color image is printed by using the four types of inks (Y, M, C, and K inks). However, the present invention is not limited to this. For example, the present invention can be applied to monochrome image printing using only black ink.

In addition, the color printing apparatus of the above embodiment prints according to the inkjet method. However, the present invention is not limited to this and other printing method, e.g., an electrophotographic method can be applicable.

<Third Embodiment>

Printing control with a large VRAM area will be described below using the printing apparatus of the second embodiment as a common apparatus.

Figure 26:
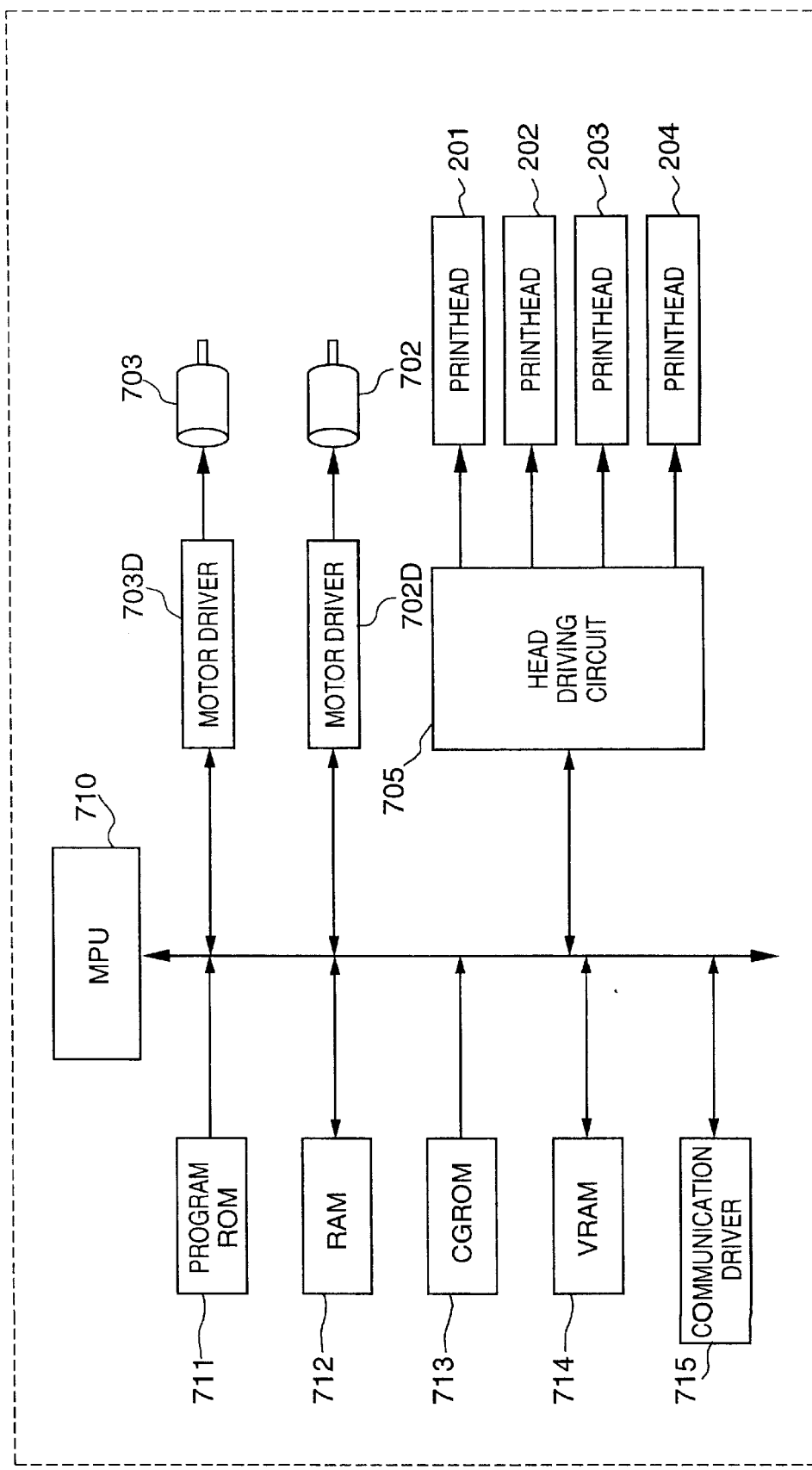
FIG. 26 is a block diagram showing the arrangement of the control circuit of a printing apparatus according to a third embodiment of the present invention.

FIG. 26 is a block diagram showing the arrangement of the control circuit of the printing apparatus of this embodiment. As can be seen from comparison between FIGS. 26 and 13, the only difference between the third and second embodiments is that the third embodiment has no gate array (G/A). In this embodiment, therefore, a VRAM 714 is controlled by a MPU 710. Since the remaining constituent elements are common to the apparatus shown in FIG. 13, the same reference numerals in FIG. 26 denote the same parts as in FIG. 13, and a description thereof will be omitted.

Figure 27:
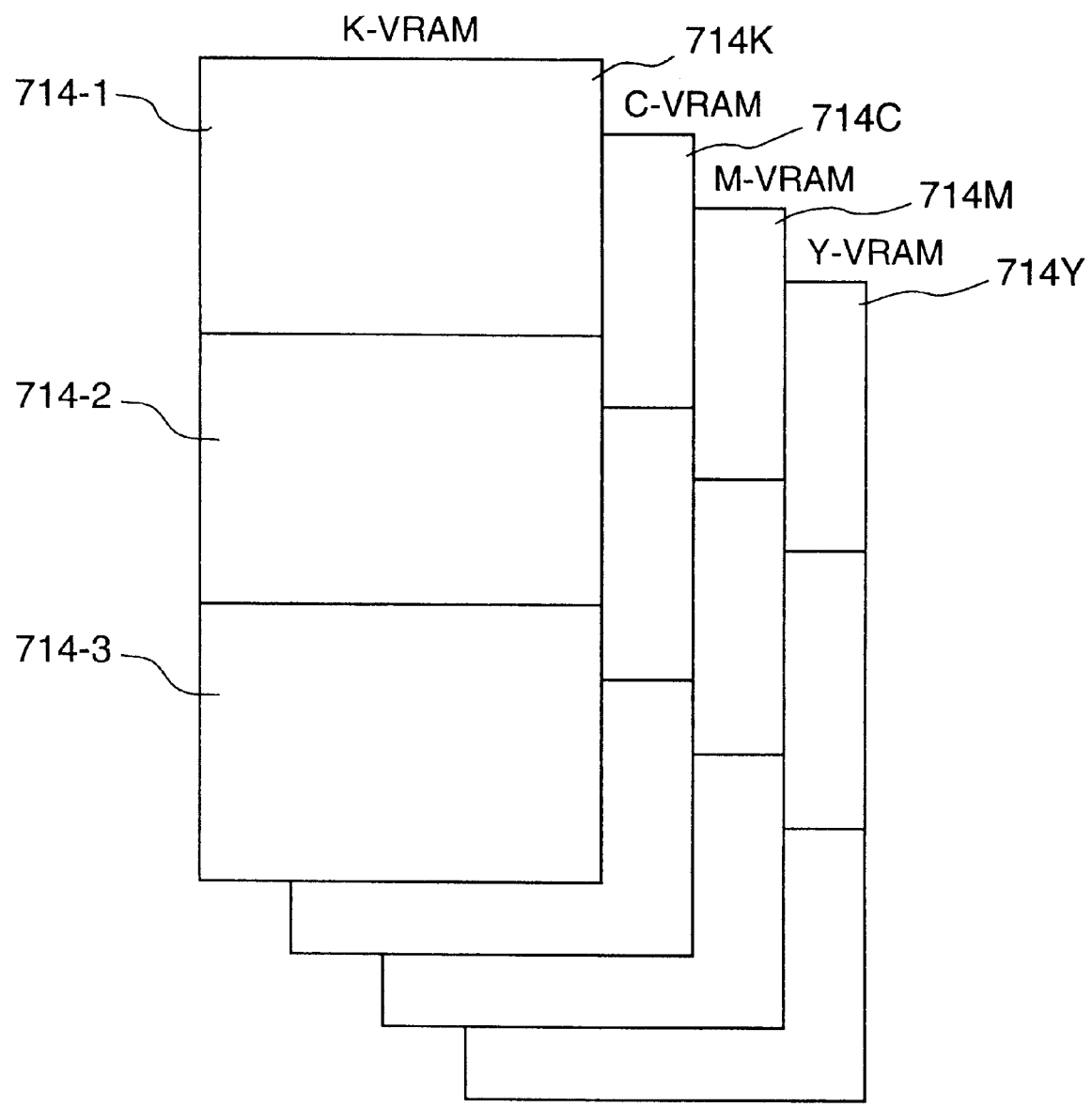
FIG. 27 is a view showing the arrangement of a print buffer.

FIG. 27 shows the arrangement of print buffers.

As described above, the VRAM 714 has print buffers 714-1, 714-2, and 714-3, for each of Y, M, C, and K components, which correspond to three printing paper sheets. In these buffers, print data are bitmapped and stored. The buffer arrangement for each color component is the same as that shown in FIG. 14. The same reference numerals in FIG. 27 therefore denote the same parts as in FIG. 14, and a description thereof will be omitted.

With the use of such print buffers corresponding to a plurality of pages, printout operation to be executed by outputting data from the print buffers and data bitmapping processing for the subsequent pages are concurrently performed.

FIG. 28 shows commands for the execution of printing operation.

Since these commands are basically the same as those described with reference to FIG. 15, a description of common portions will be omitted, and only the characteristic part of this embodiment will be described below.

In this embodiment, when the registration start command (image registration command) shown in FIG. 28 is executed, a print buffer corresponding to one paper sheet is ensured, as an area for storing registered image data, in the VRAM 714.

Upon reception of the above commands from the host, the printing apparatus executes command reception processing basically in accordance with the flow chart of FIG. 16 described in the second embodiment.

Only processing characteristic of this embodiment will be described below with reference to FIG. 16.

If it is determined in step S909 that FLG="0", the flow advances to step S911 to bitmap the bit image data set in the "raster image command" in the print buffer 714-3 ensured as an image registration buffer.

In step S920, the print buffer 714-3 is cleared to "0" to be released.

A detailed sequence of processing for obtaining the print result shown in FIG. 17 in the printing apparatus having the above arrangement will be described below with reference to FIGS. 29 to 33.

Figure 29:
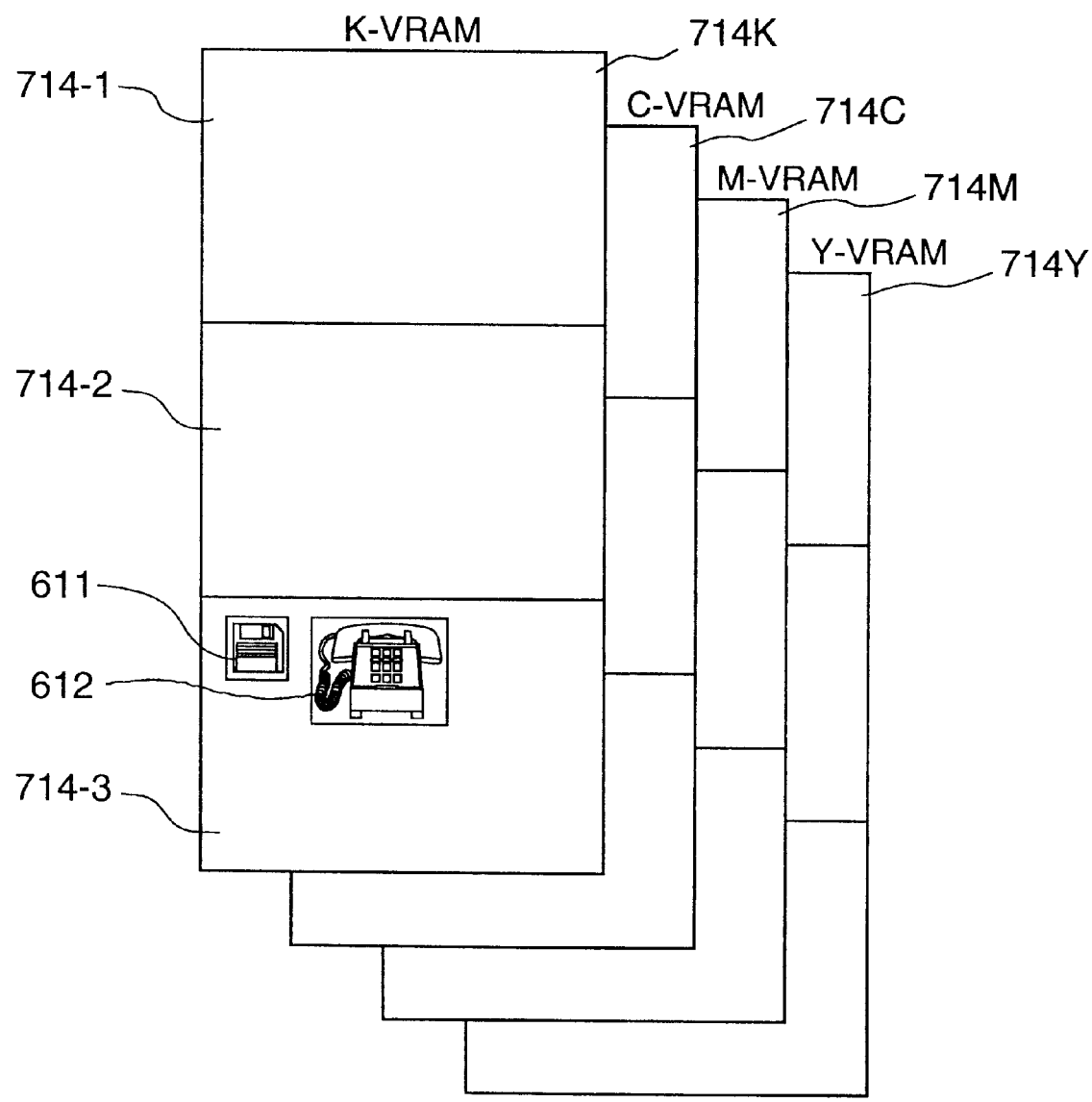
FIG. 29 is a view showing changes in the internal state of the print buffer with the progress of command processing.

FIG. 29 shows how the print buffers are used.

For the sake of simple explanation, a reference will be made to only the K component buffer frame (k-VRAM) 714K. Obviously, however, when color image data is to be processed, the buffer frames of the remaining color components are used in a similar manner.

According to this embodiment, in the K component buffer frame (K-VRAM) 714K, the print buffer 714-1 is used as a buffer for printing on a given printing paper sheet, and the print buffer 714-3 is used as an area in which image data is registered on the basis of the command received from the host. In this state, the print buffer 714-2 is not used.

FIG. 29 show a state in which basic images 611 and 612 are bitmapped in the print buffer 714-3 on the basis of the image data received from the host.

FIG. 30 shows the arrangement of an image management table which is generated or updated in step S913. This table is set in the RAM 712. As shown in FIG. 30, an image management table 800 has an image number column 801 in which numbers assigned to image data (to be managed) in the registration order are stored, an image start address column 802 in which the start addresses of the image data registered in a print buffer 714-3 are stored, and horizontal/vertical image size information columns 803 and 804 in which the horizontal and vertical sizes of the registered images are set.

The basic images 611 and 612 are registered on the basis of the image registration command (e.g., a "registration start command", a "raster image command", and a "registration end command") transmitted from the host. More specifically, the printing apparatus stores image data expressing the basic images 611 and 612 in the print buffer 714-3, as shown in FIG. 29, and registers the start addresses and the horizontal and vertical sizes of the images, in the image management table 800, together with image numbers ("1" and "2" in this case), as shown in FIG. 30, thereby managing the image data associated with the basic images 611 and 612.

Since the printout shown in FIG. 17 is made up of 10 basic images 611 and three basic images 612, when the basic images 611 and 612 are registered, the basic images 611 and 612 are copied to the print buffer 714-1 on the basis of the "registered image copy command" transmitted from the host.

Figure 31:
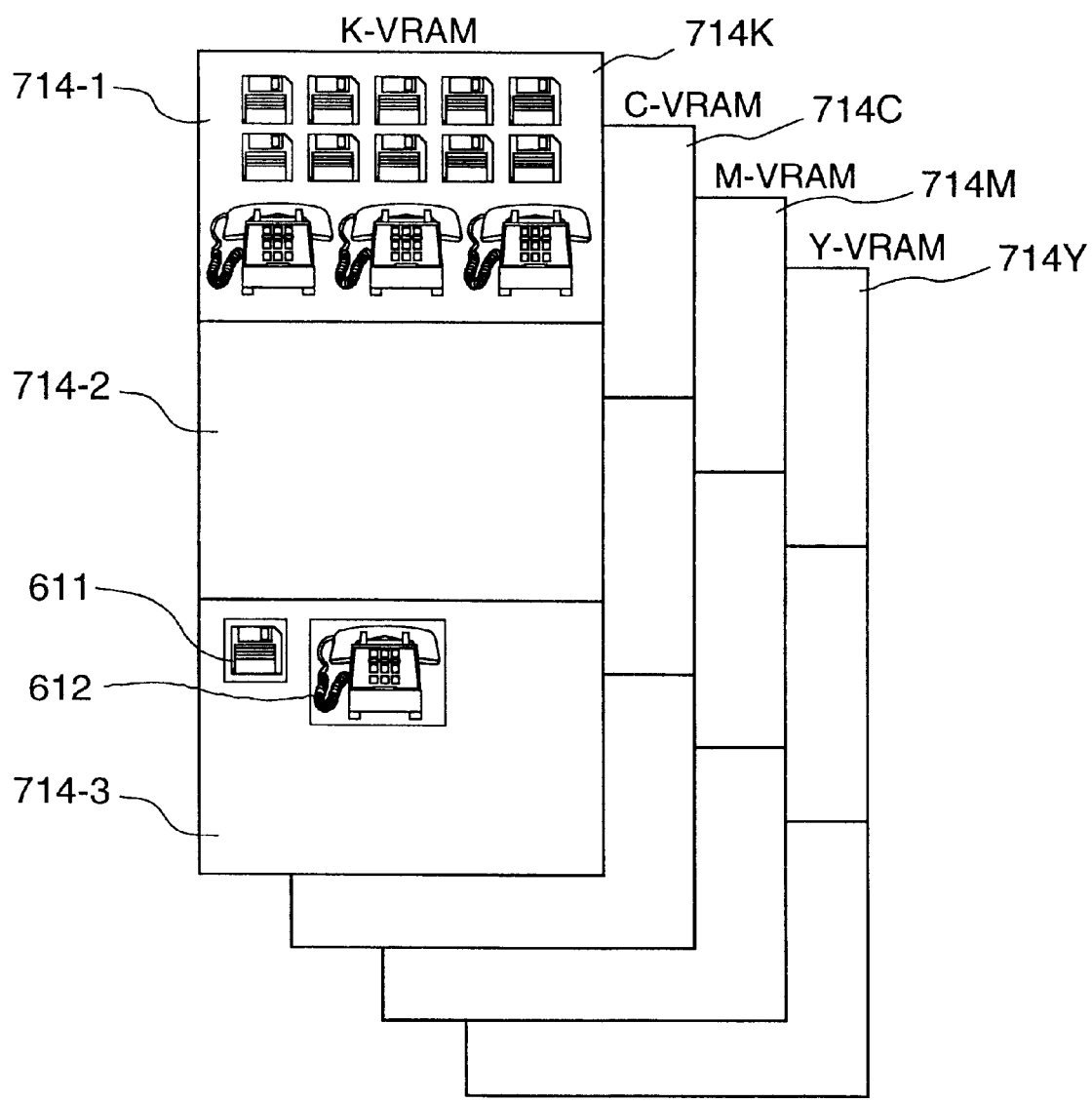
FIG. 31 is a view showing changes in the internal state of the print buffer with the progress of command processing.

FIG. 31 shows the internal states of the print buffers after the copy processing based on the "registered image copy command" is executed so as to execute the printout operation in FIG. 17.

FIG. 32 shows the contents of the operands of the "registered image copy commands" for copying the basic images 611 and 612."

Referring to FIG. 32, reference numeral 904 denotes a registered image copy command used to copy the basic image 611; and 905, a registered image copy command used to copy the basic image 612. As may be apparent from the operands of these commands, the registered image copy command 904 gives an instruction to copy the image data with the registration number "1" (i.e., the basic image 611) to 10 different positions designated by the operand of the command. The registered image copy command 905 gives an instruction to copy the image data with the registration number "2" (i.e., the basic image 612) to three different positions designated by the operand of the command.

When these commands are executed, the basic images 611 and 612 in the print buffer 714-3 are copied to the print buffer 714-1, as shown in FIG. 31.

Figure 33:
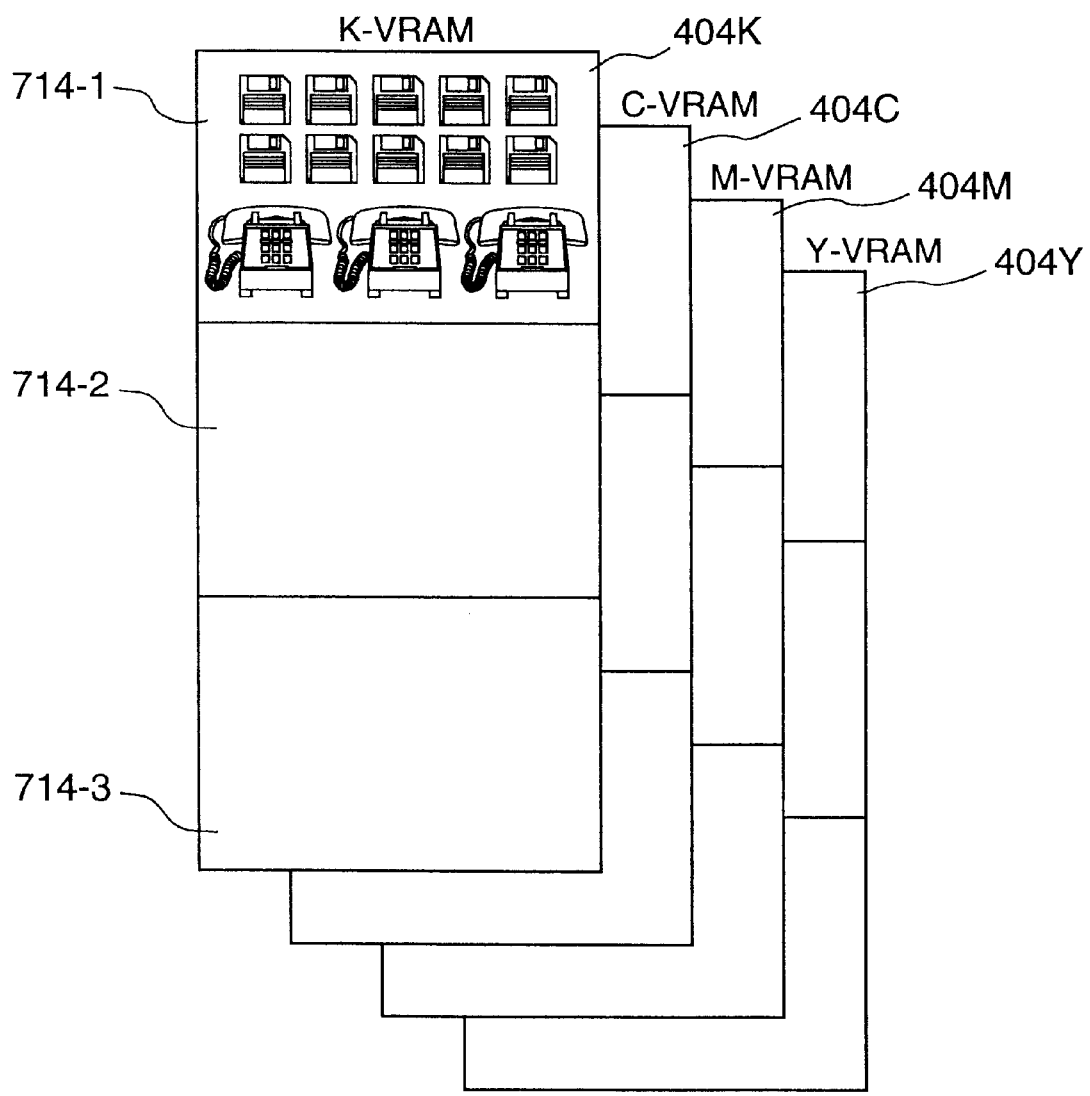
FIG. 33 is a view showing changes in the internal state of the print buffer with the progress of command processing.

When a "printing start command" is received from the host, the contents of the print buffer 714-3 are cleared to release the print buffer which has been used as the image registration area, as shown in FIG. 33, after the above copy operation is complete. With this operation, the released buffer can be used to bitmap data for the subsequent printing paper sheets.

According to the above embodiment, therefore, one of the print buffers is used as a data registration area, and registered data is copied to a plurality of positions in another print buffer. When this copy operation is complete, the registration area is released. In printing out an image having a plurality of identical patterns on one printing paper sheet, the data bitmapping efficiency can be improved as compared with the conventional method of transmitting all the data corresponding to one printing paper sheet from the host.

The total time required for printout operation can therefore be shortened.

<Fourth Embodiment>

The processing to be performed to repeatedly print out identical patterns on a plurality of printing paper sheets by using the color printing apparatus of the third embodiment will be described below.

FIG. 34 shows the commands for the execution of printing operation in this embodiment. The same reference numerals denote the same commands as those described in the third embodiment with reference to FIG. 28, and a repetitive description will be avoided.

Referring to FIG. 34, reference numeral 509 denotes a registration reset command, which serves to reset the registration of a registered image and release the image registration area in a print buffer.

Upon reception of the above commands from the host, the printing apparatus executes command reception processing in the following sequence.

Figure 35:
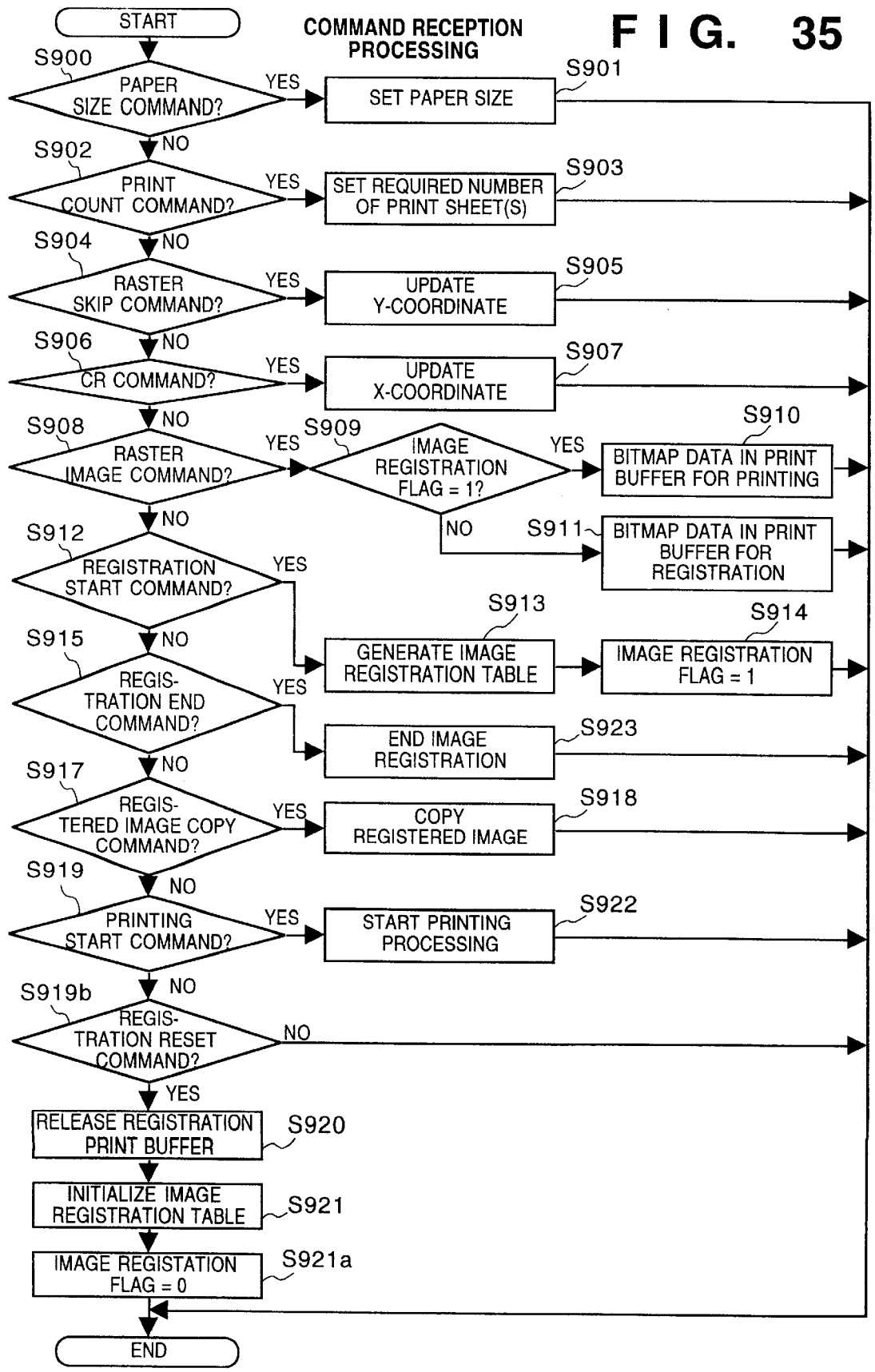
FIG. 35 is a flow chart showing received command processing according to the fourth embodiment.

FIG. 35 is a flow chart showing received command processing in this embodiment. The same step numbers denote the same steps as those described in the second embodiment with reference to FIG. 16, and a repetitive description will be avoided. Only characteristic steps of this embodiment will be described below.

Referring to FIG. 35, when the processing in step S923 is complete, the command reception processing is terminated.

If it is determined in step S919 that the received command is the "printing start command", the flow advances to step S922 to start printing processing, and the processing is terminated. In contrast to this, if it is determined that the received command is not the "printing start command", the flow advances to step S919*b* to check whether or not the received command is the "registration reset command".

If it is determined that the received command is not the "registration reset command" either, the processing is terminated. If it is determined that the received command is the "registration reset command", the flow advances to step S920 to clear a print buffer 714-3 used to store the registered image data to "0" to release it. In step S921, the image registration table is initialized. After the value of FLG is set to "0" in step S921a, the received command processing is terminated.

Figure 36A:
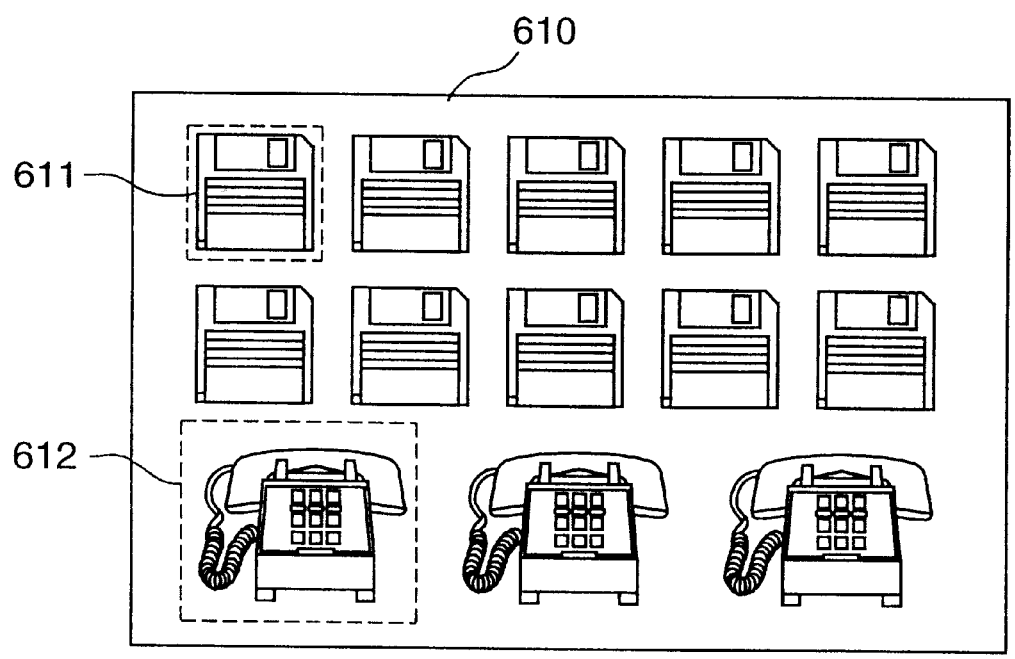
FIGS. 36A and 36B are views showing print results according to the fourth embodiment.
Figure 36B:
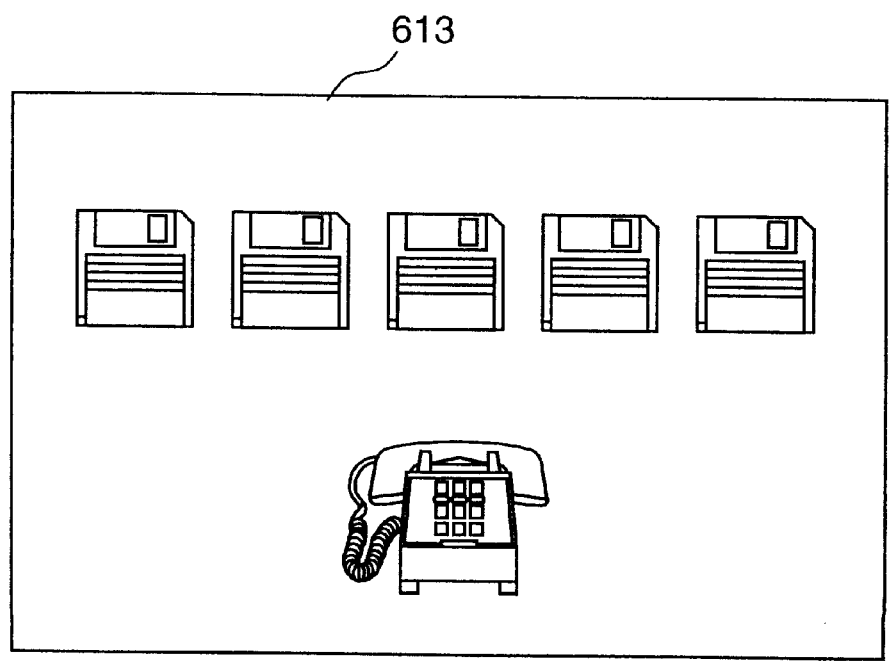

FIGS. 36A and 36B show examples of the print results obtained by the printing apparatus 210.

In this case, as shown in FIG. 36A, 10 basic images 611 and three basic images 612 are printed on a first printing paper sheet 610. In addition, as shown in FIG. 36B, five basic images 611 and one basic image 612 are printed on a second printing paper sheet 613.

The processing required to obtain the print results shown in FIGS. 36A and 36B will be described in detail next with reference to FIGS. 37 to 42. For the sake of simple explanation, a reference will be made to only a K component buffer frame (K-VRAM) 714K. Obviously, however, when color image data is to be processed, the buffer frames of the remaining color components are used in a similar way.

FIG. 37 shows the internal states of the print buffers.

FIG. 37 shows a state in which the basic images 611 and 612 are bitmapped in a print buffer 714-3, these basic images are copied to a print buffer 714-1, and the image data corresponding to the images on the first printing paper sheet, like those shown in FIG. 36A, are bitmapped.

FIG. 38 shows the contents of the operands of "registered image copy commands" for copying the basic images 611 and 612, and a printing start command. Since the contents of the operands of the "registered image copy commands" have already been described with reference to FIG. 32, a description thereof will be omitted.

When the above commands are executed, the basic images 611 and 612 in the print buffer 714-3 are copied to the print buffer 714-1, as shown in FIG. 37, and the "printing start command" is executed after the above copy operation is complete. With this operation, the first page (FIG. 36A) is printed out on the basis of the data bitmapped in the print buffer 714-1.

In this state, a command associated with printout operation for the second page is inputted from the host.

Figure 39:
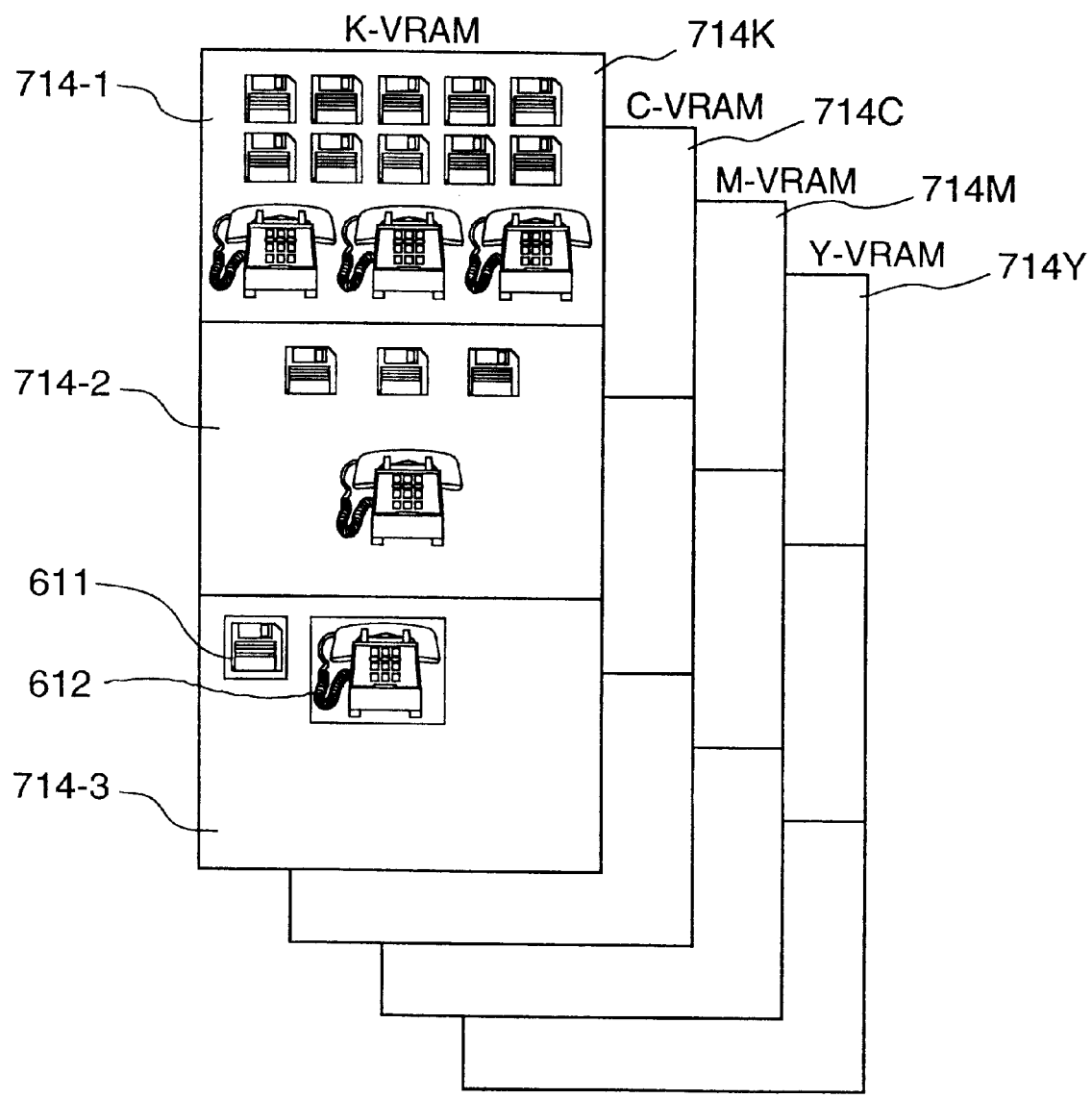
FIG. 39 is a view showing changes in the internal state of the print buffer according to the fourth embodiment.

FIG. 39 shows the internal states of the print buffers.

FIG. 40 shows the contents of the operands of the "registered image copy commands" for copying the basic images 611 and 612 to the print buffer 714-2 so as to print out the second page, and the printing start command.

Referring to FIG. 40, reference numeral 1504 denotes a registered image copy command used to copy the basic image 611; and 1505, a registered image copy command used to copy the basic image 612. As is obvious from the operands of these commands, the registered image copy command 1504 gives an instruction to copy the image data with the registration number "1" (i.e., the basic image 611) to three different positions designated by the operand of the command, and the registered image copy command 1505 gives an instruction to copy the image data with the registration number "2" (i.e., the basic image 612) to the position designated by the operand of the command.

When these commands are executed, the basic images 611 and 612 in the print buffer 714-3 are copied to the print buffer 714-2, as shown in FIG. 39, and the "printing start command" is executed after this copy operation is completed. With this processing, the second page (FIG. 36B) based on the data bitmapped in the print buffer 714-2 is printed out.

Figure 41:
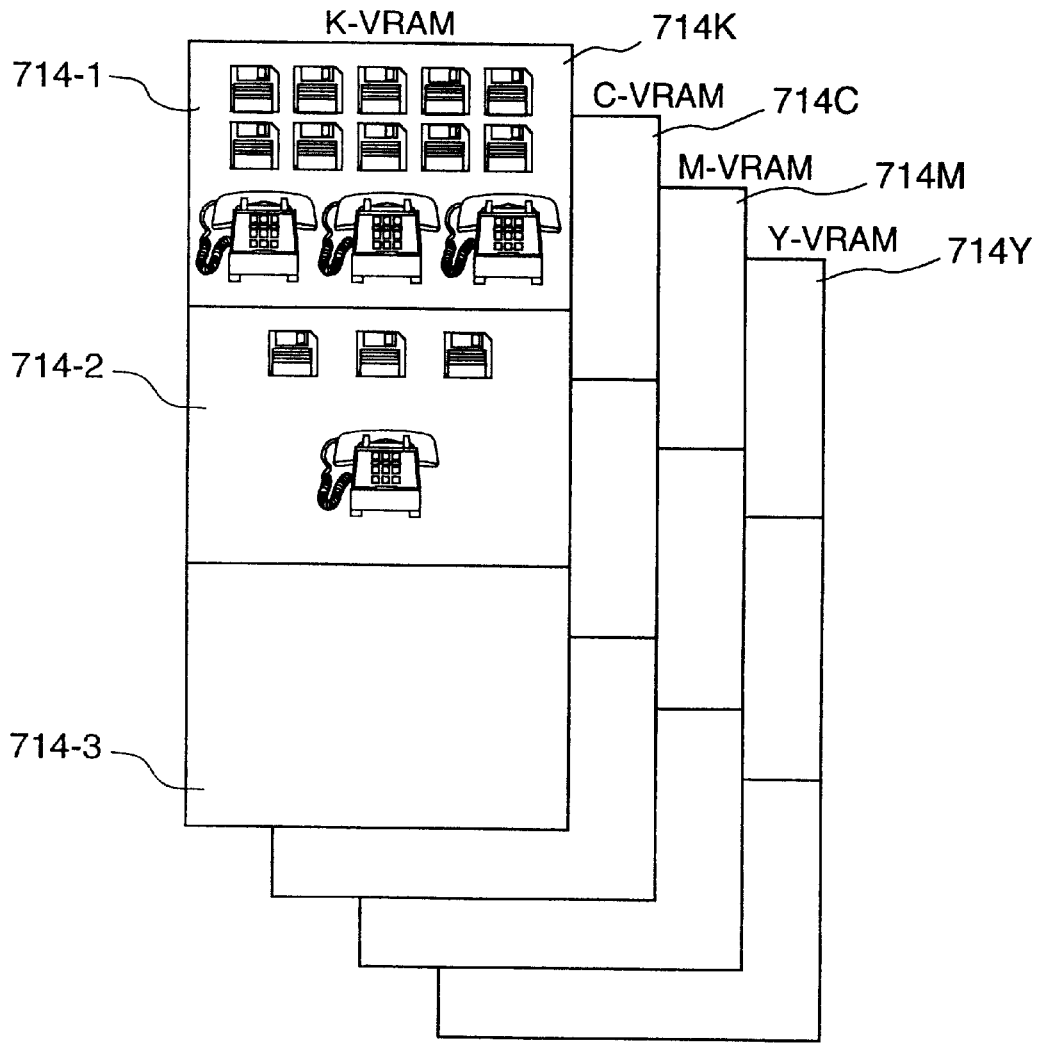
FIG. 41 is a view showing changes in the internal state of the print buffer according to the fourth embodiment.
Figure 42:
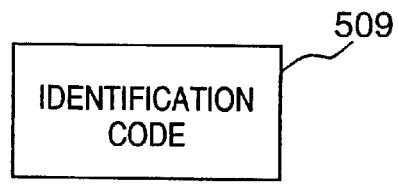
FIG. 42 is a view showing the command used to clear the print buffer according to the fourth embodiment.

Upon reception of the "registration reset command" from the host, the printing apparatus clears the contents of the print buffer 714-3 to release the print buffer used as the image registration area, as shown in FIG. 41. With this operation, the released buffer can be used to perform data bitmapping for the subsequent printing paper sheets. FIG. 42 shows the "registration reset command" used for this processing.

According to the embodiment described above, one of the print buffers is used as a data registration area, and registered data are copied to a plurality of locations in other print buffers. In addition, the timing of releasing the registration area can be controlled in accordance with a command from the host. Therefore, the data bitmapping efficiency can be improved in both the case where a plurality of identical patterns are to be printed on one printing paper sheet and the case where such patterns are to be printed on a plurality of printing paper sheets.

This also increases the speed at which a plurality of printing paper sheets are printed out. In addition, since part of a print buffer is temporarily used as a data registration area, no special storage medium such as a memory card and an interface for the storage medium are required, thereby reducing the cost of the apparatus.

Each embodiment described above has exemplified the color printing apparatus. However, thepresent invention is not limited to this. For example, the present invention can be applied to not only a color printing apparatus but also monochrome printing apparatus as long as they have a print buffer for storing print data corresponding to at least two printing paper sheets.

The color printing apparatus in each embodiment described above prints by the inkjet method. However, the present invention is not limited to this. For example, the electrophotographic method or the thermal transfer method can be used.

However, each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only an exchangeable chip type printhead, which can be electrically connected to the apparatus main unit and can receive an ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating maybe used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader and the like, a facsimile apparatus having a transmission/reception function, or an apparatus for taking a photo and printing the photo by integrating an image input device such as a digital camera, in addition to an integrated type of or a separated type of an image output terminal of an information processing equipment such as a computer.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus for printing an image on a recording medium by using a printhead, comprising:

a memory storing image data and printing position data sent from a data source, and copied image data for an image print, wherein the printing position data can designate a plurality of printing positions of the image data on the recording medium;

storing means for storing the image data and the printing position data which have been sent from the data source to the memory;

copying means for copying the image data stored in said memory to addresses in said memory corresponding to the plurality of printing positions in accordance with the printing position data; and printing means for outputting the copied image data by said copying means in said memory to said printhead, and printing the image.

2. The apparatus according to claim 1, wherein said printhead comprises printheads for discharging inks of a plurality of colors, and said memory includes memory areas for storing image data corresponding to the plurality of colors.

3. The apparatus according to claim 1, wherein the image data sent from said data source is compressed image data, and further comprising decompression means for decompressing the compressed image data.

4. The apparatus according to claim 1, wherein said memory stores a plurality of types of image data.

5. The apparatus according to claim 1, wherein said memory includes a first memory area used for storing the image data sent from the data source and a second memory area used for storing the copied image data.

6. The apparatus according to claim 1, wherein said printhead is an inkjet head for discharging ink by applying heat energy to the ink in a nozzle.

7. A printing system including the printing apparatus claimed in claim 1, wherein the data source comprises transmission means for transmitting designated image data to said printing apparatus; and position transmission means for transmitting position information designating a printing position of image data on a recording medium to said printing apparatus.

8. The system according to claim 7, wherein said printhead comprises printheads for discharging inks of a plurality of colors, and said memory includes memory areas for storing image data corresponding to the plurality of colors.

9. The system according to claim 7, wherein the image data sent from the data source is compressed image data, and further comprising decompression means for decompressing the compressed image data.

10. The system according to claim 7, wherein said memory stores a plurality of types of image data.

11. The system according to claim 7, wherein the data source further comprises:

input means for inputting character information; and character transmission means for transmitting the character information input from said input means to said printing apparatus, and wherein said printing apparatus comprises printing control means for causing said printing means to print the character information transmitted by said character transmission means, together with the image data.

12. The system according to claim 7, wherein said printhead is an inkjet head for discharging ink by applying heat energy to the ink in a nozzle.

13. The apparatus according to claim 1, further comprising:

input means for inputting the image data and a printing command for the image data.

14. The apparatus according to claim 13, wherein said memory includes a first memory area used for storing the image data and a second memory area used for storing the copied image data, to be printed on a recording medium, by said copying means, said storing means stores the image data in the first memory area on the basis of the printing command input by said input means, and said copying means copies the image data stored in the first memory area into the second memory area on the basis of the printing command input by said input means, and further comprising control means for controlling to concurrently execute a copy operation performed by said copying means and a storing operation performed by said storing means.

15. The apparatus according to claim 14, wherein said storing means includes registration means for registering image data input by said input means as image data to be repeatedly used.

16. The apparatus according to claim 15, wherein said control means controls to execute the copy operations by said copying means concurrently with a registration operation by said registration means and a storing operation by said storing means performed when image data different from the image data used for the copy operation is inputted.

17. The apparatus according to claim 14, wherein said printing means prints on the basis of the image data stored in the second memory area.

18. The apparatus according to claim 17, wherein the image data is color image data, and the color image data includes yellow (Y), magenta (M), cyan (C), and black (K) components.

19. The apparatus according to claim 18, wherein said printing means includes storage areas, in each of the first and second memory areas, which correspond to the yellow (Y), magenta (M), cyan (C), and black (K) components.

20. The apparatus according to claim 17, wherein said printing means prints by using a full-line printhead having a printing width equivalent to a width of the recording medium.

21. The apparatus according to claim 20, wherein said printhead is an inkjet printhead for printing by discharging ink.

22. The apparatus according to claim 21, wherein said printhead is a printhead for discharging ink by using heat energy and comprises an electrothermal transducer for generating heat energy to be applied to the ink.

23. The apparatus according to claim 14, wherein said storing means comprises a table for managing a storage address in the first memory area, for each pattern image expressed by the image data, and horizontal and vertical sizes of the pattern image.

24. The apparatus according to claim 14, wherein the printing command includes a registration command for giving an instruction to store and register the image data in the first memory area, and a copy command for giving an instruction to bitmap/copy the image data registered in the first memory area into the second memory area.

25. The apparatus according to claim 24, wherein said control means executes a copy command for registered image data, and at the same time, executes a registration command for newly input image data.

26. The apparatus according to claim 1, further comprising input means for inputting the image data and a printing command for the image data.

27. The apparatus according to claim 26, wherein said memory comprises a print buffer having a plurality of areas for performing printing on the recording medium, said storing means stores the image data inputted by said input means into one of the plurality of areas of the print buffer on the basis of the printing command inputted by said input means, and said copying means copies the image data stored by said storing means into another area of the print buffer on the basis of the printing command inputted by said input means.

28. The apparatus according to claim 27, wherein said printing means prints on the basis of the copied image data.

29. The apparatus according to claim 28, further comprising:

registration means for registering the image data inputted by said input means; and buffer releasing means for canceling registration of the registered image data, and clearing contents of the area of said print buffer in which the registered image data is stored.

30. The apparatus according to claim 29, wherein the operation performed by said buffer releasing means is started in response to a printing operation start command for said printing means.

31. The apparatus according to claim 29, wherein the operation performed by said buffer releasing means is started in response to a buffer release command inputted by said input means.

32. The apparatus according to claim 31, wherein the print buffer release command is executed by said buffer releasing means after printing on a plurality of pages of the recording medium is completed.

33. The apparatus according to claim 27, wherein the number of areas of the print buffer is at least three.

34. The apparatus according to claim 29, wherein said registration means assigns one of the plurality of areas of the print buffer as an area for storing the registered image data.

35. The apparatus according to claim 27, wherein the image data is color image data, and the color image data includes yellow (Y), magenta (M), cyan (C), and black (K) components.

36. The apparatus according to claim 35, wherein each of the plurality of areas of the print buffer are storage areas, each corresponding to the yellow (Y), magenta (M), cyan (C), and black (K) components.

37. The apparatus according to claim 27, wherein said printing means prints by using a full-line printhead having a printing width equivalent to a width of the recording medium.

38. The apparatus according to claim 37, wherein said printhead is an inkjet printhead for printing by discharging ink.

39. The apparatus according to claim 38, wherein said printhead is a printhead for discharging ink by using heat energy and comprises an electrothermal transducer for generating heat energy to be applied to the ink.

40. The apparatus according to claim 29, wherein said registration means comprises a table for managing a storage address in one of the plurality of areas of the print buffer, for each pattern image expressed by the image data, and horizontal and vertical sizes of the pattern image.

41. A printing method of printing an image on a recording medium by using a printhead, comprising the steps of:

storing image data and printing position data sent from a data source in a memory, wherein the printing position data can designate a plurality of printing positions of the image data on the recording medium;

copying the image data stored in the memory to addresses in the memory which correspond to the plurality of printing positions in accordance with the printing position data; and outputting the copied image data in the memory in said copying step to said printhead, and printing the image.

42. The method according to claim 41, wherein said printhead comprises printheads for discharging inks of a plurality of colors, and the memory includes memory areas for storing image data corresponding to the plurality of colors.

43. The method according to claim 41, wherein the image data sent from said data source is compressed image data, and further comprising the step of decompressing the compressed image data.

44. The method according to claim 41, wherein the memory stores a plurality of types of image data sent from the data source.

45. The method according to claim 41, further comprising the step of inputting the image data and a printing command for the image data.

46. The method according to claim 45, wherein the memory includes a first memory area used for storing the image data, and a second memory area for storing the copied image data in said copying step which is to be printed on a recording medium, said storing step stores the image data in the first memory area on the basis of the printing command inputted in said inputting step, and said copying step copies the image data stored in the first memory area into the second memory area on the basis of the printing command inputted in said inputting step, and further comprising the step of controlling to concurrently execute a copy operation performed in said copying step and a storing operation performed in said storing step.

47. The method according to claim 46, wherein the outputting step prints on the basis of the image data stored in the second memory area.

48. The method according to claim 41, further comprising the step of inputting the image data and a printing command for the image data.

49. The method according to claim 48, wherein the memory comprises a print buffer having a plurality of areas for storing image data for printing on the recording medium, said storing step stores the image data into one of the plurality of areas of the print buffer on the basis of the printing command inputted in said inputting step, and said copying step copies the stored image data into another area of the print buffer on the basis of the printing command inputted in said inputting step.

50. The method according to claim 49, wherein said outputting step prints on the basis of the copied image data.

51. The method according to claim 50, further comprising the steps of:

registering the image data in the print buffer; and canceling registration of the registered image data, and clearing contents of the area of the print buffer in which the registered image data is stored.

52. A printing apparatus comprising:

input means for inputting image data and a printing command for the image data, wherein the printing command includes printing position data designating a plurality of printing positions of the image data on a recording medium;

a memory having a first area used for storing the image data inputted by said input means and a second area used for storing the image data to be printed on the recording medium;

storing means for storing the image data into the first area on the basis of the printing command inputted by said input means;

copy means for copying the image data stored in the first area into a plurality of positions in the second area on the basis of the plurality of printing positions designated by the printing position data included in the printing command inputted by said input means;

control means for controlling to concurrently execute a copy operation performed by said copy means and a storing operation performed by said storage means; and printing means for printing on the basis of the image data stored in the second area.

53. A printing method of controlling printing by using a memory having a first area for storing image data and a second area for storing the image data to be printed on a recording medium, comprising the steps of:

inputting image data and a printing command for the image data, wherein the printing command includes printing position data designating a plurality of printing positions of the image data on the recording medium;

storing the image data in the first area on the basis of the printing command inputted in said inputting step;

copying the image data stored in the first area into a plurality of positions in the second area on the basis of the plurality of printing positions designated by the printing position data included in the printing command input in said inputting step;

controlling to concurrently execute a copy operation performed in said copying step and a storing operation performed in said storing step; and printing on the basis of the image data stored in the second area.

54. A printing apparatus for printing on a recording medium by using a print buffer having a plurality of areas for storing image data, comprising:

input means for inputting image data and a printing command for the image data, wherein the printing command includes printing position data designating a plurality of printing positions of the image data on the recording medium;

storing means for storing the image data in one of the plurality of areas of the print buffer on the basis of the printing command inputted by said input means;

copy means for copying the image data stored by said storing means into other areas of the print buffer on the basis of the plurality of printing positions designated by the printing position data included in the printing command inputted by said input means; and printing means for printing on the basis of the copied image data.

55. A method of printing by using a print buffer having a plurality of areas for storing image data, comprising the steps of:

inputting image data and a printing command for the image data, wherein the printing command includes printing position data designating a plurality of printing positions of the image data on a recording medium;

storing the image data in one of the plurality of areas of the print buffer on the basis of the printing command input in said inputting step;

copying the stored image data into other areas of the print buffer on the basis of the plurality of printing positions designated by the printing position data included in the printing command inputted in said input step; and printing on the basis of the copied image data.

* * * * *

UNITED STATES PATENT AND TRADEMARK OFFICE
CERTIFICATE OF CORRECTION

PATENT NO. : 6,384,921 B1  Page 1 of 1
DATED : May 7, 2002
INVENTOR(S) : Saijo et al.

It is certified that error appears in the above-identified patent and that said Letters Patent is hereby corrected as shown below:

Column 3,
Line 31, "above-apparatus" should read -- above apparatus --.

Column 10,
Line 11, "406to" should read -- 406 to --.

Column 12,
Line 8, "Instep" should read -- In step --.

Column 16,
Line 21, "processing In" should read -- processing. In --.

Column 19,
Line 29, "show" should read -- shows --.

Column 22,
Line 24, "thepresent" should read -- the present --.

Column 23,
Line 65, "maybe" should read -- may be --.

Column 24,
Line 36, "are" should read -- being --.

Signed and Sealed this

Third Day of September, 2002

Attest:

Attesting Officer

JAMES E. ROGAN
Director of the United States Patent and Trademark Office